(12) United States Patent
Nordstrom et al.

(10) Patent No.: US 8,650,349 B2
(45) Date of Patent: Feb. 11, 2014

(54) MEMORY MAPPED INPUT/OUTPUT BUS ADDRESS RANGE TRANSLATION FOR VIRTUAL BRIDGES

(75) Inventors: Gregory M. Nordstrom, Pine Island, MN (US); Steven M. Thurber, Austin, TX (US); Curtis C. Wollbrink, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 822 days.

(21) Appl. No.: 12/787,799

(22) Filed: May 26, 2010

(65) Prior Publication Data

US 2011/0296074 A1   Dec. 1, 2011

(51) Int. Cl.
*G06F 13/36* (2006.01)

(52) U.S. Cl.
USPC ............................ 710/306; 710/312; 710/316

(58) Field of Classification Search
USPC .............. 710/9, 10, 104, 105, 305, 306, 312, 710/316, 317
See application file for complete search history.

(56) References Cited

U.S. PATENT DOCUMENTS

| | | | |
|---|---|---|---|
| 6,931,473 B2 * | 8/2005 | Graham et al. ............... | 710/311 |
| 7,293,129 B2 * | 11/2007 | Johnsen et al. ............... | 710/313 |
| 7,506,084 B2 | 3/2009 | Moerti et al. | |
| 7,587,575 B2 | 9/2009 | Moertl et al. | |
| 7,590,817 B2 | 9/2009 | Moertl et al. | |
| 7,600,093 B2 | 10/2009 | Ben-Yehuda et al. | |
| 7,979,592 B1 * | 7/2011 | Pettey et al. ...................... | 710/3 |
| 2004/0123014 A1 * | 6/2004 | Schaefer et al. ............... | 710/313 |
| 2004/0230709 A1 * | 11/2004 | Moll ................................. | 710/1 |
| 2006/0179195 A1 * | 8/2006 | Sharma et al. ................ | 710/123 |
| 2006/0195617 A1 | 8/2006 | Arndt et al. | |
| 2006/0195623 A1 | 8/2006 | Arndt et al. | |
| 2006/0242354 A1 * | 10/2006 | Johnsen et al. ............... | 710/316 |
| 2006/0294261 A1 * | 12/2006 | Nordstrom et al. ............... | 710/3 |
| 2007/0061549 A1 | 3/2007 | Kaniyur et al. | |
| 2007/0067505 A1 | 3/2007 | Kaniyur et al. | |

(Continued)

OTHER PUBLICATIONS

IBM U.S. Appl. No. 12/758,213 entitled "Hierarchical to Physical Bus Translation" filed by William J. Armstrong et al. on Apr. 12, 2010.

(Continued)

*Primary Examiner* — Khanh Dang
(74) *Attorney, Agent, or Firm* — Owen J. Gamon; James R. Nock

(57) ABSTRACT

In an embodiment, a south chip comprises a first virtual bridge connected to a shared egress port and a second virtual bridge also connected to the shared egress port. The first virtual bridge receives a first secondary bus identifier, a first subordinate bus identifier, and a first MMIO bus address range from a first north chip. The second virtual bridge receives a second secondary bus identifier, a second subordinate bus identifier, and a second MMIO bus address range from a second north chip. The first virtual bridge stores the first secondary bus identifier, the first subordinate bus identifier, and the first MMIO bus address range. The second virtual bridge stores the second secondary bus identifier, the second subordinate bus identifier, and the second MMIO bus address range. The first north chip and the second north chip are connected to the south chip via respective first and second point-to-point connections.

17 Claims, 9 Drawing Sheets

(56) References Cited

U.S. PATENT DOCUMENTS

| | | |
|---|---|---|
| 2007/0097950 A1* | 5/2007 | Boyd et al. .................... 370/351 |
| 2007/0300241 A1 | 12/2007 | Prakash et al. |
| 2009/0037614 A1 | 2/2009 | Saripalli |
| 2009/0089464 A1 | 4/2009 | Lach et al. |
| 2009/0133016 A1 | 5/2009 | Brown et al. |
| 2009/0133028 A1 | 5/2009 | Brown et al. |
| 2009/0144731 A1 | 6/2009 | Brown et al. |
| 2010/0036995 A1* | 2/2010 | Nakayama et al. .......... 710/316 |
| 2010/0161872 A1* | 6/2010 | Daniel .......................... 710/316 |
| 2010/0312943 A1* | 12/2010 | Uehara et al. ................ 710/316 |
| 2011/0029693 A1* | 2/2011 | Brinkmann et al. ............. 710/8 |

OTHER PUBLICATIONS

IBM U.S. Appl. No. 12/758,256 entitled "Hierarchical to Physical Memory Mapped Input/Output Translation" filed by William J. Armstrong et al. on Apr. 12, 2010.

IBM U.S. Appl. No. 12/758,329 entitled "Physical to Hierarchical Bus Translation" filed by William J. Armstrong et al. on Apr. 12, 2010.

IBM U.S. Appl. No. 12/758,383 entitled "Translating a Requester Identifier to a Chip Identifier" filed by William J. Armstrong et al. on Apr. 12, 2010.

IBM U.S. Appl. No. 12/774,210 entitled "Memory Mapped Input/Output Bus Address Range Translation" filed by David R. Engebretsen et al. on May 5, 2010.

* cited by examiner

| ROUTING TABLE | | | | | 147-1 |
|---|---|---|---|---|---|
| VIRTUAL BRIDGE ID (409) | CHIP ID (410) | SECONDARY BUS ID (411) | SUBORDINATE BUS ID (412) | MMIO BAR (414) | |
| PTP A | CHIP C | BUS D | BUS D | 0X1000 - 0X1FFF | 401 |
| PTP C | CHIP D | BUS F | BUS F | 0X3000 - 0X3FFF | 402 |

FIG. 4

| ROUTING TABLE | | | | | 147-2 |
|---|---|---|---|---|---|
| VIRTUAL BRIDGE ID (509) | CHIP ID (510) | SECONDARY BUS ID (511) | SUBORDINATE BUS ID (512) | MMIO BAR (514) | |
| PTP B | CHIP C | BUS I | BUS I | 0X3000 - 0X3FFF | 501 |
| PTP D | CHIP D | BUS K | BUS K | 0X6000 - 0X6FFF | 502 |

FIG. 5

MEMORY MAPPED INPUT/OUTPUT BUS ADDRESS RANGE TRANSLATION FOR VIRTUAL BRIDGES

FIELD

An embodiment of the invention generally relates to computer systems and more particularly to MMIO (Memory Mapped Input/Output) bus address range translation for virtual bridges connected to computer system buses.

BACKGROUND

Computer systems typically comprise a combination of computer programs and hardware, such as semiconductors, transistors, chips, and circuit boards. The hardware within a computer system is typically organized into components, such as processors, storage devices, and I/O (Input/Output) devices. These components typically communicate with each other via another component called a bus.

Buses can be parallel buses, which carry data words or multiple bits in parallel on multiple wires, or serial buses, which carry data in bit-serial form. A bus can be point-to-point, meaning that the bus connects only two components, or multi-drop, meaning that more than two components are connected to the bus. In a multi-drop bus, typically the bus has both data and address wires, and components connected to the bus listen for their unique destination address on the address wires, in order to discern whether data on the data wires is intended for them.

One example of a computer bus is called PCI EXPRESS (PERIPHERAL COMPONENT INTERCONNECT EXPRESS), which uses a network of point-to-point serial links. A pair of point-to-point PCI serial links make up a lane. A hub routes the lanes and acts as a crossbar switch. This dynamic point-to-point behavior allows more than one pair of devices to communicate with each other at the same time. This format also allows channel grouping, where multiple lanes are bonded to a single device pair in order to provide higher bandwidth.

PCI EXPRESS devices communicate via a logical connection called an interconnect or link. A link is a point-to-point communication channel between two PCI EXPRESS ports, allowing both to send/receive ordinary PCI-requests (e.g., configuration read/writes, I/O read/writes, and memory read/writes) and interrupts. At the physical level, a link comprises one or more lanes.

A lane comprises a transmit and a receive pair of differential lines. Each lane comprises four wires, meaning that, conceptually, each lane is a full-duplex byte stream, transporting packets containing the data in eight-bit byte format, between the two endpoints of a link, in both directions simultaneously. PCI EXPRESS transmissions send control messages, including interrupts, over the same links used for data.

One way of accessing memory via an I/O bus is via a technique called memory-mapped I/O (MMIO), in which a processor maps addresses in an I/O device into the processor's address space in memory. Areas of the processor's addressable space in memory are reserved for I/O to/from I/O devices. This reservation may be either temporary or permanent. Each I/O device monitors the bus and responds to any processor's read/write from/to the device-assigned address space in memory. Thus, if the processor issues a read instruction to the device-assigned address space in memory, the I/O device receives the instruction from the bus and transmits the data (onto the bus) that is located at the corresponding address within the I/O device. Similarly, if the processor issues a write instruction to the device-assigned address space in memory, the I/O device receives the data from the bus and writes it to the corresponding address within the I/O device. In some MMIO schemes, the processor instructions that read/write from/to the device-assigned address space in memory are the same instructions that read/write from/to memory in address spaces that are not reserved for I/O devices. In other MMIO schemes, the processor instructions that read/write from/to the device-assigned address space in memory are different instructions from those that read/write from/to memory in address spaces that are not reserved for I/O devices.

SUMMARY

A method, computer-readable storage medium, and computer system are provided. In an embodiment, a south chip comprises a first virtual bridge connected to a shared egress port and a second virtual bridge also connected to the shared egress port. The first virtual bridge receives a first secondary bus identifier, a first subordinate bus identifier, and a first MMIO bus address range from a first north chip. The second virtual bridge receives a second secondary bus identifier, a second subordinate bus identifier, and a second MMIO bus address range from a second north chip. The first virtual bridge stores the first secondary bus identifier that identifies a bus that is immediately downstream from the first virtual bridge, the first subordinate bus identifier that identifies a highest bus identifier of all of buses reachable downstream from the first virtual bridge, and the first MMIO bus address range. The second virtual bridge stores the second secondary bus identifier that identifies a bus that is immediately downstream from the second virtual bridge, the second subordinate bus identifier that identifies a highest bus identifier of all of the buses reachable downstream from the second virtual bridge, and the second MMIO bus address range. The first north chip and the second north chip are connected to the south chip via respective first and second point-to-point connections.

BRIEF DESCRIPTION OF THE SEVERAL VIEWS OF THE DRAWINGS

FIG. 4 depicts a block diagram of an example data structure for a routing table, according to an embodiment of the invention.

FIG. 5 depicts a block diagram of an example data structure for another routing table, according to an embodiment of the invention.

It is to be noted, however, that the appended drawings illustrate only example embodiments of the invention, and are therefore not considered a limitation of its scope, for the invention may admit to other equally effective embodiments.

DETAILED DESCRIPTION

Figure 1:
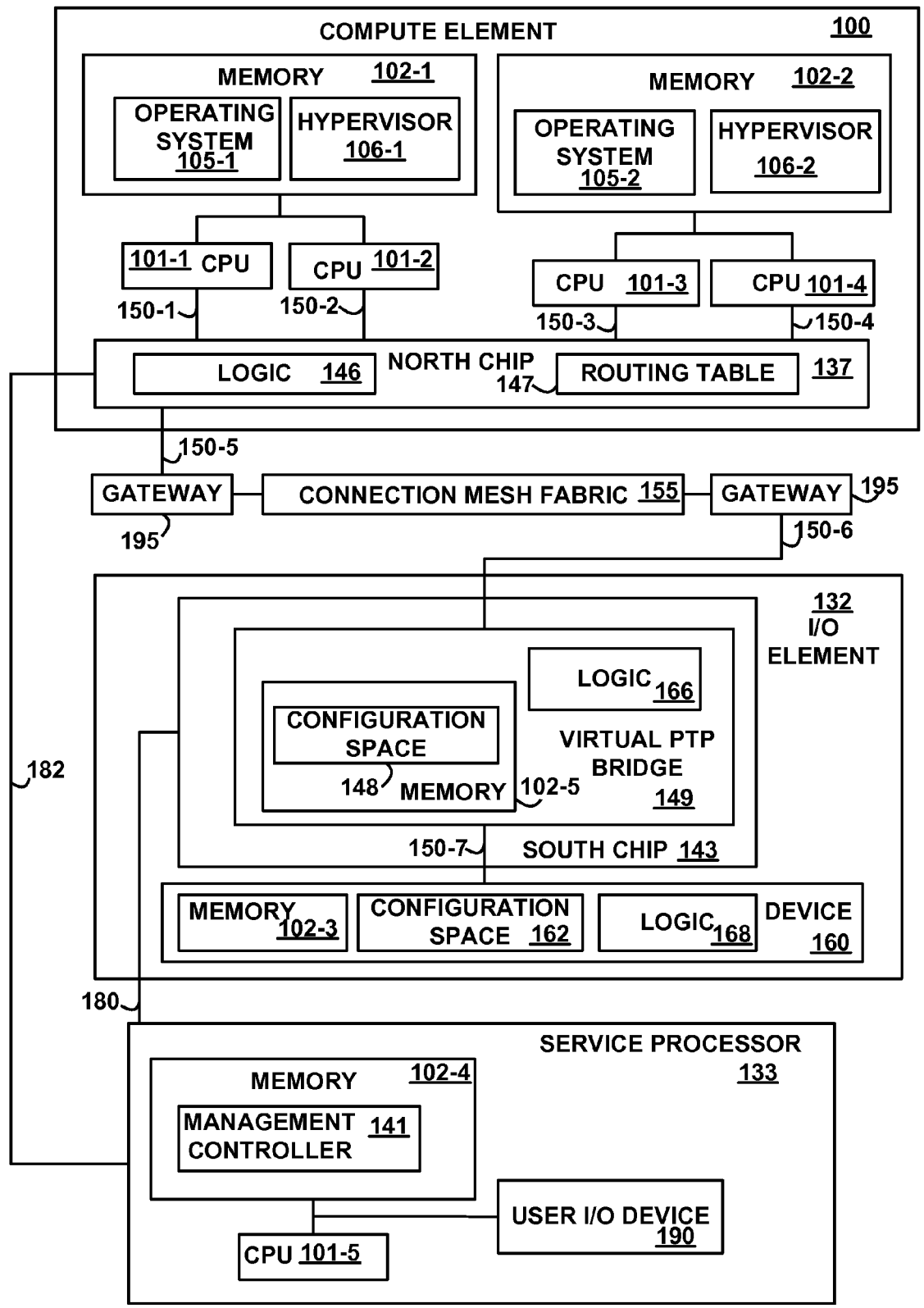
FIG. 1 depicts a high-level block diagram of an example system for implementing an embodiment of the invention.

Referring to the Drawings, wherein like numbers denote like parts throughout the several views, FIG. 1 depicts a high-level block diagram representation of a computer system comprising the major components of a compute element 100 connected to an I/O (Input/Output) element 132 via gateways 195 and a connection mesh fabric 155. The I/O element 132 is also connected to a service processor 133 via a communications link 180, and the compute element 100 is connected to the service processor 133 via a communications link 182.

The major components of the compute element 100 comprise memory 102-1, memory 102-2, central processing units (CPUs) 101-1, 101-2, 101-3, and 101-4, and a north chip 137. The CPUs 101-1 and 101-2 are connected to and share the memory 102-1, and the CPUs 101-3 and 101-4 are connected to and share the memory 102-2 via respective memory buses. The CPUs 101-1, 101-2, 101-3, and 101-4 are connected to the north chip 137 via respective buses 150-1, 150-2, 150-3, and 150-4. The CPUs 101-1, 101-2, 101-3, and 101-4 are also referred to herein as processors. The north chip 137 is connected to the connection mesh fabric 155 via a bus 150-5 and a gateway 195.

In various embodiments, the compute element 100 is a multi-user mainframe computer system, single-user computer system, or a server computer or similar electronic device that has little or no direct user interface, but receives requests from other computer systems (clients). In other embodiments, the compute element 100 is implemented as a desktop computer, a portable computer, a laptop or notebook computer, a tablet computer, a pocket computer, a telephone, a smart phone, a pager, an automobile, a teleconferencing system, an appliance, or any other appropriate type of electronic device.

Each processor executes instructions stored in the memory 102-1 or 102-2, and each processor may also include cache memory. The memories 102-1 and 102-2 store or encode respective operating systems 105-1 and 105-2, which, when executed on the respective processors, control the operations of the compute element 100. The memories 102-1 and 102-2 further store or encode respective hypervisors 106-1 and 106-2, which allocate resources to their respective operating systems 105-1 and 105-2.

The compute element 100 may use virtual addressing mechanisms that allow the programs of the compute element 100 to behave as if they only have access to a large, single storage entity instead of access to multiple, smaller storage entities. Thus, all portions of an operating system 105-1 and 105-2, and the hypervisors 106-1 and 106-2 are not necessarily completely stored in the same storage device at the same time.

In various embodiments, the north chip 137 is implemented as a chip, integrated circuit, circuit board, logic devices, memory, and/or a processor. The north chip 137 comprises logic 146 and a routing table 147. The routing table 147 is stored in memory or a storage device and comprises a translation, mapping, or assignment of virtual bridge identifiers and chip identifiers to secondary bus identifiers, subordinate bus identifiers, and MMIO bus address ranges, as further described below with reference to FIGS. 4 and 5. The logic 146 controls the operations of the north chip 137.

In an embodiment, the connection mesh fabric 155 comprises a point-to-point serial connection between the compute element 100 and the I/O element 132 via the gateways 195. In other embodiments, the connection mesh fabric 155 may be any suitable network or combination of networks and may support any appropriate protocol suitable for communication of data and/or code to/from the compute element 100 and the I/O element 132. In an embodiment, the connection mesh fabric 155 may be implemented via an Ethernet network, but in other embodiments any appropriate network or combination of networks implementing any appropriate protocol may be used.

In an embodiment, the connection mesh fabric 155 uses a different communications protocol than do the buses 150-5 and 150-6, and the gateways 195 are electronic components that join and translate between buses of different protocols. Although the gateways 195 as illustrated as separate from the compute element 100, the connection mesh fabric 155, and the I/O element 132, in other embodiments, the gateways 195 may be implemented as a component in the compute element 100, in the connection mesh fabric 155, or in the I/O element 132.

In various embodiments, the I/O element 132 is implemented as a system element, an electronic device, an endpoint, a computer, or a circuit board. The I/O element 132 comprises a south chip 143 connected to the connection mesh fabric 155 via a bus 150-6 and a gateway 195. The south chip 143 is further connected to a device 160 via a bus 150-7. The south chip 143 is implemented as a chip, integrated circuit, circuit board, logic devices, memory, and/or a processor. In an embodiment, the south chip 143 is identical to the north chip 137, but the chips 137 and 143 perform different functions depending on whether they are located on the compute element 100 or the I/O element 132. In another embodiment, the chips 137 and 143 are different, and each is customized for its respective element.

The south chip 143 comprises a virtual PTP (PCI to PCI) bridge, which comprises a configuration space 148 stored in memory 102-5 and logic 166. A virtual bridge is an electronic component or components that forward packets of data and/or commands between two different networks, different segments of networks, or different buses that use the same communications protocol, based on a destination address in the packet. Although an embodiment of the invention is described in the context of the PCI EXPRESS bus protocol, in other embodiments any appropriate bus protocol may be used. The configuration space 148 is further described below with reference to FIG. 6.

In an embodiment, the device 160 comprises a storage device or a combination of storage devices, either connected within the I/O element 132 or connected directly or indirectly to the I/O element 132. In another embodiment, the device 160 comprises a network adapter, I/O adapter, or I/O processor that connects to a communications network. Although the device 160 is illustrated as being contained within the I/O element 132, in another embodiment, the device 160 is separate from and connected to the I/O element 132. The device 160 comprises a configuration space 162, logic 168, and memory 102-3, which the compute element 100 may access via MMIO commands, requests, or operations sent to the device 160 via the connection mesh fabric 155, the gateways 195, and the south chip 143. The configuration space 162 is stored in memory, registers, or a storage device and is further described below with reference to FIG. 7.

In an embodiment, the logic 146, 166, and 168 are implemented as chips, circuits, and/or logic devices. In another embodiment, the logic 146, 166, and/or 168 comprise memory encoded with instructions or statements and a processor on which the instructions or statements execute or are interpreted. The logic 146, 166, and 168 perform processing, operations, or functions, as further described below with reference to FIGS. 8, 9A, 9B, and 10.

Although the buses 150-1, 150-2, 150-3, 150-4, 150-5, 150-6, and 150-7 are shown in FIG. 1 as relatively simple, single bus structures providing direct communication paths, in fact the buses 150-1, 150-2, 150-3, 150-4, 150-5, 150-6, and 150-7 may comprise multiple different buses or communication paths, which may be arranged in any of various forms, such as point-to-point links in hierarchical, star or web configurations, multiple hierarchical buses, parallel and redundant paths, or any other appropriate type of configuration. In an embodiment, the buses 150-1, 150-2, 150-3, and 150-4, 150-5, 150-6, and 150-7 are point-to-point serial buses, such as the PCI EXPRESS bus, but in other embodiments, any appropriate bus may be used. Furthermore, buses 150-1, 150-2, 150-3, 150-4, 150-5, 150-6, and 150-7 may comprise memory buses, I/O buses, I/O bus interface units, I/O processors, or any multiple and/or combination thereof.

The service processor 133 comprises memory 102-4 connected via a bus to a CPU 101-5 and a user I/O device 190. The memory 102-4 stores or encodes a management controller 141. In an embodiment, the management controller 141 comprises instructions or statements that execute or are interpreted by instructions that execute on the CPU 101-5. In another embodiment, the management controller 141 comprise circuits or logic devices in lieu of or in addition to a processor based system. The management controller 141 performs processing, operations, or functions, as further described below with reference to FIG. 8.

In various embodiments, the user input/output device 190 may include user output devices (such as a video display device, speaker, printer, and/or television set) and user input devices (such as a keyboard, mouse, keypad, touchpad, trackball, buttons, light pen, or other pointing device). A user may manipulate the user input devices, in order to provide input to the user input/output device 190 and the management controller 141 via a user interface, and may receive output via the user output devices. For example, a user interface may be presented via the user I/O device 190, such as displayed on a display device, played via a speaker, or printed via a printer.

In various embodiments, the service processor 133 is implemented as a multi-user mainframe computer system, single-user computer system, or a server computer or similar electronic device that has little or no direct user interface, but receives requests from other computer systems (clients). In other embodiments, the compute element 100 is implemented as a desktop computer, a portable computer, a laptop or notebook computer, a tablet computer, a pocket computer, a telephone, a smart phone, a pager, an automobile, a teleconferencing system, an appliance, or any other appropriate type of electronic device.

In various embodiments, the memory 102-1, 102-2, 102-3, 102-4, and 102-5 are random-access semiconductor memory, registers, storage devices, non-volatile memory, volatile memory, disk drives, or storage mediums for storing or encoding data and programs. The memory 102-1, 102-2, 102-3, 102-4, and 102-5 are conceptually single monolithic entities, but in other embodiments the memory 102-1, 102-2, 102-3, 102-4, and 102-5 are more complex arrangements, such as hierarchies of caches and/or other memory devices.

For example, the memory 102-1, 102-2, 102-3, 102-4, and 102-5 may exist in multiple levels of memory devices of varying sizes and speeds.

It should be understood that FIG. 1 is intended to depict the representative major components of the compute element 100, the connection mesh fabric 155, the gateways 195, the I/O element 132, and the service processor 133 at a high level, that individual components may have greater complexity than represented in FIG. 1, that components other than or in addition to those shown in FIG. 1 may be present, and that the number, type, and configuration of such components may vary. Several particular examples of such additional complexity or additional variations are disclosed herein; it being understood that these are by way of example only and are not necessarily the only such variations.

The various program components illustrated in FIG. 1 and implementing various embodiments of the invention may be implemented in a number of manners, including using various computer applications, routines, components, programs, objects, modules, data structures, etc., and are referred to hereinafter as "computer programs," or simply "programs." The computer programs comprise one or more instructions or statements that are resident at various times in various memory and storage devices in the compute element 100, the I/O element 132, the service processor 133, and/or the device 160 and that, when read and executed by one or more processors in the compute element 100, the I/O element 132, the service processor 133, and/or the device 160 or when interpreted by instructions that are executed by one or more processors, cause the compute element 100, I/O element 132, the service processor 133, and/or the device 160 to perform the actions necessary to execute steps or elements comprising the various aspects of embodiments of the invention.

As will be appreciated by one skilled in the art, aspects of embodiments of the present invention may be embodied as a system, method, or computer program product. Accordingly, aspects of embodiments of the present invention may take the form of an entirely hardware embodiment, an entirely program embodiment (including firmware, resident programs, micro-code, etc., which are stored in a storage device) or an embodiment combining program and hardware aspects that may all generally be referred to herein as a "circuit," "module," or "system." Furthermore, embodiments of the present invention may take the form of a computer program product embodied in one or more computer-readable medium(s) having computer-readable program code embodied thereon.

Any combination of one or more computer-readable medium(s) may be utilized. The computer-readable medium may be a computer-readable signal medium or a computer-readable storage medium. A computer-readable storage medium, may be, for example, but not limited to, an electronic, magnetic, optical, electromagnetic, infrared, or semiconductor system, apparatus, or device, or any suitable combination of the foregoing. More specific examples (an non-exhaustive list) of the computer-readable storage media may comprise: an electrical connection having one or more wires, a portable computer diskette, a hard disk, a random access memory (RAM), a read-only memory (ROM), an erasable programmable read-only memory (EPROM) or Flash memory, an optical fiber, a portable compact disc read-only memory (CD-ROM), an optical storage device, a magnetic storage device, or any suitable combination of the foregoing. In the context of this document, a computer-readable storage medium may be any tangible medium that can contain, or store, a program for use by or in connection with an instruction execution system, apparatus, or device. Examples of computer-readable storage media include the memory 102-1, 102-2, 102-3, 102-4, and 102-5.

A computer-readable signal medium may comprise a propagated data signal with computer-readable program code embodied thereon, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that communicates, propagates, or transports a program for use by, or in connection with, an instruction execution system, apparatus, or device.

Program code embodied on a computer-readable medium may be transmitted using any appropriate medium, including but not limited to, wireless, wire line, optical fiber cable, Radio Frequency (RF), or any suitable combination of the foregoing.

Computer program code for carrying out operations for aspects of embodiments of the present invention may be written in any combination of one or more programming languages, including object oriented programming languages and conventional procedural programming languages. The program code may execute entirely on the user's computer, partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of embodiments of the present invention are described below with reference to flowchart illustrations and/or block diagrams of methods, apparatus (systems), and computer program products. Each block of the flowchart illustrations and/or block diagrams, and combinations of blocks in the flowchart illustrations and/or block diagrams may be implemented by computer program instructions embodied in a computer-readable medium. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified by the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture, including instructions that implement the function/act specified by the flowchart and/or block diagram block or blocks. The computer programs defining the functions of various embodiments of the invention may be delivered to the compute element 100, the I/O element 132, the service processor 133, and/or the device 160 via a variety of tangible computer-readable storage media that may be operatively or communicatively connected (directly or indirectly) to the processor or processors.

The computer program instructions may also be loaded onto a computer, the compute element 100, the I/O element 132, the service processor 133, and/or the device 160, other programmable data processing apparatus, or other devices to cause a series of operational steps to be performed on the computer, other programmable apparatus, or other devices to produce a computer-implemented process, such that the instructions, which execute on the computer or other programmable apparatus, provide processes for implementing the functions/acts specified in the flowcharts and/or block diagram block or blocks.

The flowchart and the block diagrams in the figures illustrate the architecture, functionality, and operation of possible implementations of systems, methods, and computer program products, according to various embodiments of the present invention. In this regard, each block in the flowcharts or block diagrams may represent a module, segment, or portion of code, which comprises one ore more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It should also be noted that each block of the block diagrams and/or flowchart illustration, and combinations of blocks in the block diagrams and/or flow chart illustrations, can be implemented by special purpose hardware-based systems that perform the specified functions or acts, in combinations of special purpose hardware and computer instructions.

Embodiments of the present invention may also be delivered as part of a service engagement with a client corporation, nonprofit organization, government entity, or internal organizational structure. Aspects of these embodiments may comprise configuring the compute element 100, the I/O element 132, the service processor 133, and/or the device 160 to perform, and deploying computing services (e.g., computer-readable code, hardware, and web services) that implement, some or all of the methods described herein. Aspects of these embodiments may also comprise analyzing the client company, creating recommendations responsive to the analysis, generating computer-readable code to implement portions of the recommendations, integrating the computer-readable code into existing processes, compute elements, and computing infrastructure, metering use of the methods and systems described herein, allocating expenses to users, and billing users for their use of these methods and systems.

In addition, various programs described hereinafter may be identified based upon the application for which they are implemented in a specific embodiment of the invention. But, any particular program nomenclature that follows is used merely for convenience, and thus embodiments of the invention should not be limited to use solely in any specific application identified and/or implied by such nomenclature.

The exemplary environments illustrated in FIG. 1 are not intended to limit the present invention. Indeed, other alternative hardware and/or program environments may be used without departing from the scope of embodiments the invention.

Figure 2:
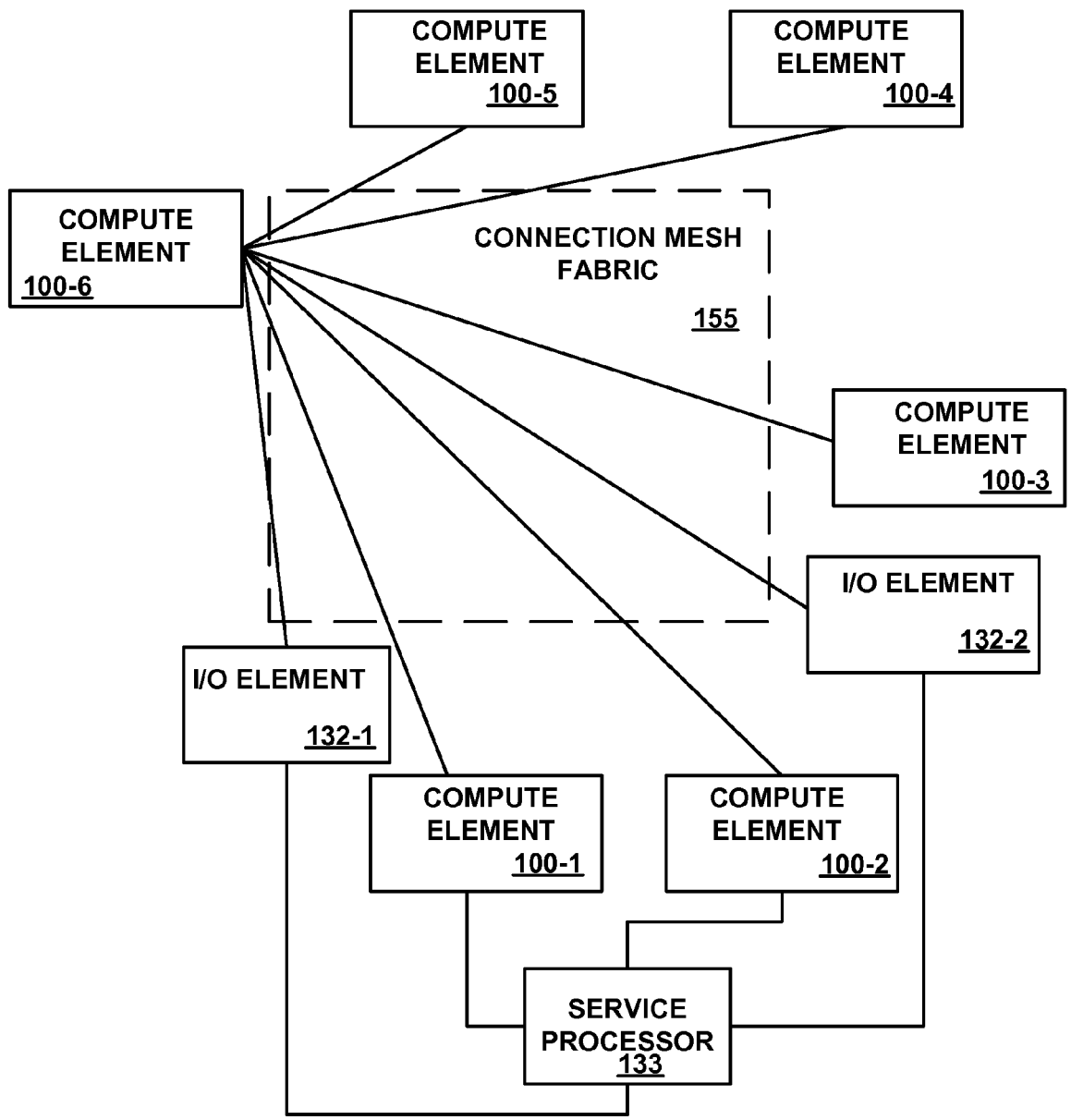
FIG. 2 depicts a block diagram illustrating selected components of an embodiment of the invention.

FIG. 2 depicts a block diagram illustrating the interaction of selected components of an embodiment of the invention. The compute elements 100-1, 100-2, 100-3, 100-4, 100-5, and 100-6, and the I/O elements 132-1 and 132-2 are connected via the connection mesh fabric 155 and the gateways 195 (FIG. 1). The compute elements 100-1, 100-2, 100-3, 100-4, 100-5, and 100-6 are examples of, and are generically referred to by, the compute element 100 (FIG. 1). The I/O elements 132-1 and 132-2 are examples of, and are generically referred to by, the I/O element 132 (FIG. 1).

The connection mesh fabric 155 comprises serial point-to-point links. For convenience of illustration, FIG. 2 depicts compute element 100-6 as connected to every other compute and I/O element 100-1, 100-2, 100-3, 100-4, 100-5, 132-1, and 132-2. But, all compute elements 100 and I/O elements 132 are connected to each and every other compute element 100 and I/O element 132 via high speed point-to-point links in an interconnection of everything-to-everything, which is referred to as the connection mesh fabric 155. Thus, e.g., the compute elements 100-1 and 100-2 are both connected to the I/O element 132-1 via different point-to-point serial connections. As another example, the compute elements 100-1 and 100-2 are both connected to the I/O element 132-2 via different point-to-point serial connections. Hence, if one point-to-point link fails, elements may still communicate to each other by hopping though another element. In an embodiment, the connection mesh fabric 155 is not necessarily confined to a single chassis or rack, but may span multiple chassis or racks.

In a serial communication link, data is sent one bit at a time, sequentially over a single channel, wire, or bus. Serial communication is in contrast to parallel communication, where several bits are sent together, on a link with several parallel channels or wires.

The service processor 133 is illustrated as connected to the compute elements 100-1 and 100-2 and the I/O elements 132-1 and 132-2, but in other embodiments, the service processor 133 is connected to every compute element 100 and I/O element 132.

Figure 3:
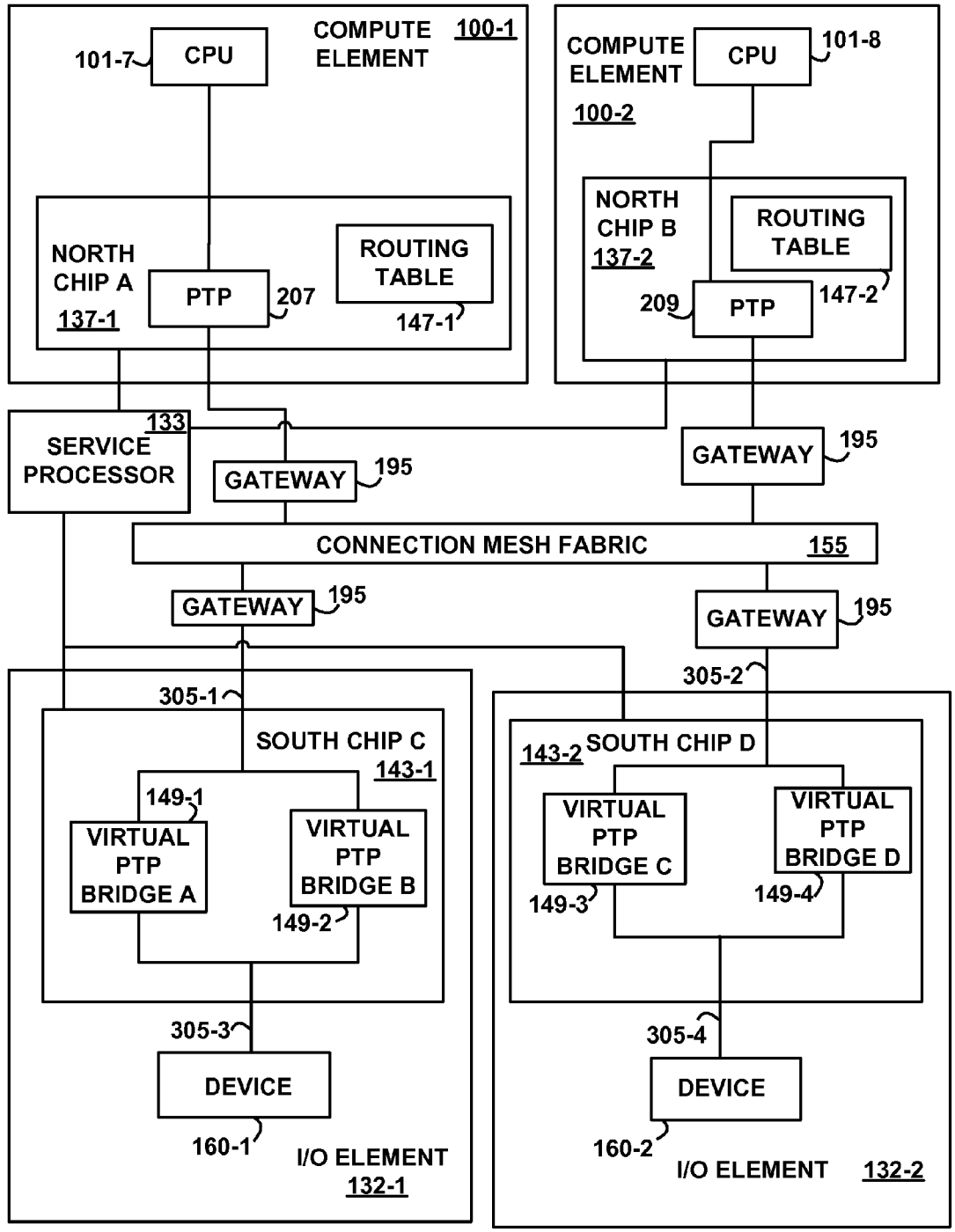
FIG. 3 depicts a block diagram illustrating more detail of selected components of an embodiment of the invention.

FIG. 3 depicts a block diagram illustrating more detail of selected components of an embodiment of the invention. As illustrated in FIG. 3, the compute elements 100-1 and 100-2 are connected via the gateways 195 and the connection mesh fabric 155 to the I/O elements 132-1 and 132-2.

The compute element 100-1 comprises a CPU 101-7 connected via a bus to a PTP (PCI to PCI) bridge 207 in a north chip 137-1. The north chip 137-1 is further connected to the service processor 133. The CPU 101-7 is an example of the CPUs 101-1, 101-2, 101-3, or 101-4 (FIG. 1).

The north chip 137-1 comprises a PTP bridge 207, meaning that both the ingress and egress buses that are connected to respective ingress and egress ports of the PTP bridge 207 are the same type of bus using the same protocol, such as in an embodiment, both being PCI buses. The north chip 137-1 further comprises a routing table 147-1, which is an example of, and is generically referred to by, the routing table 147 (FIG. 1). The north chip 137-1 is an example of, and is generically referred to by, the north chip 137 (FIG. 1).

The compute element 100-2 comprises a CPU 101-8 connected via a bus to a PTP bridge 209 in a north chip 137-2. The north chip 137-2 is further connected to the service processor 133. The CPU 101-8 is an example of the CPUs 101-1, 101-2, 101-3, or 101-4 (FIG. 1).

The north chip 137-2 comprises the PTP (PCI to PCI) bridge 209, meaning that both the ingress and the egress bus that are connected to respective ingress and egress ports of the PTP bridge 209 communicate via the same bus protocol, such as in an embodiment both being PCI buses. The north chip 137-2 further comprises a routing table 147-2, which is an example of, and is generically referred to by, the routing table 147 (FIG. 1). The north chip 137-2 is an example of, and is generically referred to by, the north chip 137 (FIG. 1).

The I/O element 132-1 comprises a south chip 143-1 connected to the gateway 195 via the ingress port 305-1 via a bus and connected to the device 160-1 via an egress port 305-3 and a bus. The south chip 143-1 comprises a virtual PTP bridge 149-1 and a virtual PTP bridge 149-2, which are examples of an generically referred to by the virtual PTP bridge 149 (FIG. 1). The ingress port 305-1 is a receiving port, meaning that the virtual PTP bridges 149-1 and 149-2 receive signals from the upstream gateway 195 via the ingress port 305-1 and an ingress bus. The egress port 305-3 is a sending port, meaning that the virtual PTP bridges 149-1 and 149-2 send signals to the downstream device 160-1 via the egress port 305-3 and egress bus. The virtual PTP bridges 149-1 and 149-2 share the same ingress port 305-1 and bus that connects to upstream to the gateway 195 and also share the same egress port 305-3 and bus that connects downstream to the device 160-1.

In an embodiment, a single port may act as an ingress port at one time while data is being transmitted in one direction and an egress port at other time at another time while data is being transmitted in the other direction. In another embodiment, a single port only acts as an ingress or an egress port, and multiple ports are present, in order to provide bi-directional data transfer (both from a compute element 100 to a device 160 and from a device 160 to a compute element 100).

The I/O element 132-2 comprises a south chip 143-2 connected to the gateway 195 via the ingress port 305-2 via a bus and connected to the device 160-2 via an egress port 305-3 and a bus. The south chip 143-2 comprises a virtual PTP bridge 149-3 and a virtual PTP bridge 149-4, which are examples of an generically referred to by the virtual PTP bridge 149 (FIG. 1). The ingress port 305-2 is a receiving port, meaning that the virtual PTP bridges 149-3 and 149-4 receive signals from the upstream gateway 195 via the ingress port 305-2 and an ingress bus. The egress port 305-4 is a sending or transmitting port, meaning that the virtual PTP bridges 149-3 and 149-4 send signals to the downstream device 160-2 via the egress port 305-4 and egress bus. The virtual PTP bridges 149-3 and 149-4 share the same ingress port 305-2 and ingress bus and also share the same egress port 305-4 and egress bus.

The devices 160-1 and 160-2 are examples of, and are generically referred to by, the device 160 (FIG. 1). Each of the devices 160-1 and 160-2 stores or encodes in its memory a respective MMIO address range. These MMIO addresses ranges may be different for different compute elements, meaning that a different compute element may access the same memory location within a device 160 via different ranges of MMIO addresses.

FIG. 4 depicts a block diagram of an example data structure for a routing table 147-1, according to an embodiment of the invention. The routing table 147-1 comprises example rows 401 and 402, each of which includes a virtual PTP bridge identifier field 409, a south chip identifier field 410, a secondary bus identifier field 411, a subordinate bus identifier field 412, and an MMIO bus address range field 414.

The MMIO bus address range field 414 specifies a range or extent of MMIO addresses that the compute element 100-1 may use to address or access the memory of a device or devices 160 that are downstream from the virtual PTP bridge 149 (identified by the value in the virtual PTP bridge identifier field 409 in the same row) in a south chip 143 (identified by the value in the south chip identifier 410 in the same row). Thus, the MMIO bus address range assigned to a virtual PTP bridge 149 is the range of MMIO addresses that are assigned and addressable to devices 160 downstream from that virtual PTP bridge 149. The downstream device or devices 160 are connected to the virtual PTP bridge 409 via a bus or buses whose bus identifiers are encompassed by, or are within, the bus range specified by the secondary bus identifier 411 and the subordinate bus identifier 412, in the same row. The secondary bus identifier 411 identifies the first bus that is immediately downstream from the virtual PTP bridge 409 and that connects directly to the virtual PTP bridge 409. The subordinate bus identifier 412 specifies the highest (largest) bus identifier of all of the buses that can be reached downstream from the virtual PTP bridge 409. In various embodiments, buses that can be reached (are reachable) downstream from the virtual PTP bridge 409 are connected directly to the virtual PTP bridge 409 or indirectly through other virtual PTP bridges. Downstream refers to a relative physical position of a component (either a bus or a device 160) that is farther from the compute element 100 than is the relative position of a component that is upstream, or nearer to the compute element 100.

Using the example of FIG. 3, the device 160-1 is downstream from the virtual PTP bridge A 149-1, and the virtual PTP bridge A 149-1 is upstream from the device 160-1 because the device 160-1 is farther from the compute element 100-1 (or the compute element 100-2) than is the virtual PTP bridge A 149-1. The device 160-1 is also downstream from the virtual PTP bridge B 149-2, and the virtual PTP bridge B 149-2 is upstream from the device 160-1 because the device 160-1 is farther from the compute element 100-1 (or the compute element 100-2) than is the virtual PTP bridge A 149-2.

Referring again to FIG. 4, in the example routing table 147-1, each row 401 and 402 has identical respective secondary bus identifiers 411 and subordinate bus identifiers 412 because, in the example of FIG. 3, each virtual PTP bridge 149-1 and 149-3 has only one downstream bus (connected to the respective ports 305-3 and 305-4). But, in other embodiments, the I/O elements may include a hierarchy of virtual PTP bridges 149, in which a particular virtual PTP bridge has multiple downstream PTP bridges and/or buses.

The MMIO bus address range field 414 specifies a beginning (lower bound or memory base address) of the range and an end (upper bound or memory limit address) of the range. The memory base address is less than the memory limit address. The values in the MMIO bus address range field 414 are unique within the compute element 100-1 that assigns them, but are not necessarily unique within a south chip 143 or across all south chips 143. That is, multiple devices 160 connected to the same south chip 143 may have the same values or overlapping range values in their respective MMIO bus address range fields (in different routing tables 147 in different north chips 137) if those values were assigned by different compute elements 100. Further, multiple devices 160 connected to different south chips 143 may have the same values or overlapping range values in their respective MMIO bus address range fields (in different routing tables 147 in different north chips 137) if those values were assigned by different compute elements 100. Range values overlap if the memory base address of one range is between the memory base address and memory limit address of another range. Also, range values overlap if the memory limit address of one range is between the memory base address and memory limit address of another range.

Thus, the routing table 147-1 represents a mapping or translation of MMIO bus address ranges 414, secondary bus identifiers 411, and subordinate bus identifiers 412 used by the compute element 100-1 to virtual PTP bridge identifiers 409 that identify virtual PTP bridges 149 that are contained within south chips 143 identified by the chip identifiers 410. Thus, the MMIO bus address range 414, the secondary bus identifier 411, and the subordinate bus identifier 412 are assigned to the virtual PTP bridge identifier 409 and the south chip identifier 410 in the same row. The assignment of the MMIO bus address range 414, the secondary bus identifier 411, and the subordinate bus identifier 412 to the virtual PTP bridge identifier 409 and the south chip identifier 410 is unique within a routing table, meaning that no two rows in a routing table contain the same or overlapping MMIO bus address ranges 414.

The example row 401 in the routing table 147-1 comprises data that indicates that the south chip 143-1 identified by the value "Chip C" in the south chip identifier field 410 comprises a virtual PTP bridge 149-1 identified by the value "PTP A" in the virtual PTP bridge identifier field 409 that is assigned a secondary bus identifier 411 of "Bus D," a subordinate bus identifier 412 of "Bus D," and an MMIO bus address range 414 of 0x1000-0x1FFF.

The device 160-1 is connected to the virtual PTP bridge 149-1 identified by the virtual PTP bridge identifier 409 of "PTP A" via a bus whose bus identifier is encompassed by or falls within the range of bus identifiers specified by the secondary bus identifier 411 of "Bus D" and the subordinate bus identifier 412 of "Bus D." The virtual PTP bridge 149-1 identified by the virtual PTP bridge identifier 409 of "PTP A" forwards configuration commands that specify a bus identifier encompassed by the range of the secondary bus identifier 411 of "Bus D" and the subordinate bus identifier 412 of "Bus D" to the buses, virtual PTP bridges 149, and devices 160 that are downstream from the virtual PTP bridge "PTP A." The virtual PTP bridge 149-1 identified by the virtual PTP bridge identifier 409 of "PTP A" forwards MMIO commands that specify an MMIO address encompassed by the MMIO bus address range 414 of 0x1000-0x1FFF to the buses, virtual PTP bridges 149, and devices 160 that are downstream from the virtual PTP bridge "PTP A."

Thus, in response to the CPU 101-7 (in the same compute element 100-1 that comprises the north chip 137-1 that comprises the routing table 147-1) issuing a read/write command from/to a MMIO address within or encompassed by the range of 0x1000 through 0x1FFF, the north chip 137-1 finds the MMIO bus address range 414 in the row 401 that encompasses the MMIO address specified by the read/write command and sends the read/write command to the device 160-1 that is connected via the Bus D and the egress port 305-3 to the virtual bridge PTP A 149-1 in the south chip C 143-1.

The example row 402 in the routing table 147-1 comprises data that indicates that the south chip 143-2 identified by the value "Chip D" in the south chip identifier field 410 comprises a virtual PTP bridge 149-3 identified by the value "PTP C" in the virtual PTP bridge identifier field 409 that is assigned a secondary bus identifier 411 of "Bus F," a subordinate bus identifier 412 of "Bus F," and an MMIO bus address range 414 of 0x3000-0x3FFF.

A device 160-2 is connected to the virtual PTP bridge 149-3 identified by the virtual PTP bridge identifier 409 of "PTP C" via a bus whose bus identifier is encompassed by or falls within the range of bus identifiers specified by the secondary bus identifier 411 of "Bus F" and the subordinate bus identifier 412 of "Bus F." The virtual PTP bridge 149-3 identified by the virtual PTP bridge identifier 409 of "PTP C" forwards configuration commands that specify a bus identifier encompassed by the range of the secondary bus identifier 411 of "Bus F" and the subordinate bus identifier 412 of "Bus F" to the buses, virtual PTP bridges 149, and devices 160 that are downstream from the virtual PTP bridge "PTP C." The virtual PTP bridge 149-3 identified by the virtual PTP bridge identifier 409 of "PTP C" forwards MMIO commands that specify an MMIO address encompassed by the MMIO bus address range 414 of 0x3000-0x3FFF to the buses, virtual PTP bridges 149, and devices 160 that are downstream from the virtual PTP bridge "PTP C."

Thus, in response to the CPU 101-7 (in the same compute element 100-1 that comprises the north chip 137-1 that comprises the routing table 147-1) issuing a read/write command from/to a MMIO address within or encompassed by the range of 0x3000 through 0x3FFF, the north chip 137-1 finds the MMIO bus address range 414 in the row 402 that encompasses the MMIO address specified by the read/write command and sends the read/write command to the device 160-2 that is connected via the Bus F and the egress port 305-4 to the virtual PTP bridge PTP C 149-3 in the south chip D 143-2.

FIG. 5 depicts a block diagram of an example data structure for a routing table 147-2, according to an embodiment of the invention. The routing table 147-2 comprises example rows 501 and 502, each of which includes a virtual PTP bridge identifier field 509, a south chip identifier field 510, a secondary bus identifier field 511, a subordinate bus identifier field 512, and an MMIO bus address range field 514.

The MMIO bus address range field 514 specifies a range or extent of MMIO addresses that the compute element 100-2 may use to address the memory of a device or devices 160 that are downstream from the virtual PTP bridge 149 (identified by the value in the virtual PTP bridge identifier field 509 in the same row) in a south chip 143 (identified by the value in the south chip identifier 510 in the same row). The downstream device or devices 160 are connected to the virtual PTP bridge 509 via a bus or buses whose bus identifiers are encompassed by, or are within, the bus range specified by the secondary bus identifier 511 and the subordinate bus identifier 512, in the same row. The secondary bus identifier 511 identifies the bus immediately downstream from the virtual PTP bridge 509. The subordinate bus identifier 512 specifies the highest bus identifier of all of the buses that can be reached downstream from the virtual PTP bridge 509. Downstream refers to a relative physical position of a component (either a bus or a device 160) that is farther from the compute element 100-2 than is the relative position of a component that is upstream, or nearer the compute element 100-2. Using the example of FIG. 3, the device 160-1 is downstream from the virtual PTP bridge B 149-2, and the virtual PTP bridge B 149-2 is upstream from the device 160-1 because the device 160-1 is farther from the compute element 100-2 than is the virtual PTP bridge B 149-2.

Referring again to FIG. 5, in the example routing table 147-2, each row 501 and 502 has identical respective secondary bus identifiers 511 and subordinate bus identifiers 512 because, in the example of FIG. 3, each virtual PTP bridge 149-2 and 149-4 has one downstream bus connected to the respective egress ports 305-3 and 305-4. But, in other embodiments, the I/O elements may include a hierarchy of virtual PTP bridges 149, in which a particular virtual PTP bridge 149 has multiple downstream PTP bridges 149 and/or buses. The MMIO bus address range field 514 specifies a beginning (lower bound or memory base address) of the range and an end (upper bound or memory limit address) of the range. The memory base address is less than the memory limit address.

The values in the MMIO bus address range field 514 are unique within the compute element 100-2 that assigns them, but are not necessarily unique within a south chip 143 or across all south chips 143. That is, multiple devices 160 connected to the same south chip 143 may have the same values or overlapping range values in their respective MMIO bus address range fields (in different routing tables 147 in different north chips 137) if those values were assigned by different compute elements 100. Further, multiple devices 160 connected to different south chips 143 may have the same values or overlapping range values in their respective MMIO bus address range fields (in different routing tables 147 in different north chips 137) if those values were assigned by different compute elements 100. Range values overlap if the memory base address of one range is between the memory base address and memory limit address of another range. Also, range values overlap if the memory limit address of one range is between the memory base address and memory limit address of another range.

Thus, the routing table 147-2 represents a mapping or translation of MMIO bus address ranges 514, secondary bus identifiers 511, and subordinate bus identifiers 512 used by the compute element 100-2 to virtual PTP bridge identifiers 509 that identify virtual PTP bridges 149 that are contained within south chips identified by the chip identifiers 510. Thus, the MMIO bus address range 514, the secondary bus identifier 511, and the subordinate bus identifier 512 are assigned to the virtual PTP bridge identifier 509 and the south chip identifier 510 in the same row. The assignment of the MMIO bus address range 514, the secondary bus identifier 511, and the subordinate bus identifier 512 to the virtual PTP bridge identifier 509 and the south chip identifier 510 is unique within a routing table, meaning that no two rows in a routing table contain the same or overlapping MMIO bus address ranges 514.

The example row 501 in the routing table 147-2 comprises data that indicates that the south chip 143-1 identified by the value "Chip C" in the south chip identifier field 510 comprises a virtual PTP bridge 149-2 identified by the value "PTP B" in the virtual PTP bridge identifier field 509 that is assigned a secondary bus identifier 511 of "Bus I," a subordinate bus identifier 512 of "Bus I," and an MMIO bus address range 514 of 0x3000-0x3FFF.

The device 160-1 is connected to the virtual PTP bridge 149-2 identified by the virtual PTP bridge identifier 509 of "PTP B" via a bus whose bus identifier is encompassed by or falls within the range of bus identifiers specified by the secondary bus identifier 511 of "Bus I" and the subordinate bus identifier 512 of "Bus I." The virtual PTP bridge 149-2 identified by the virtual PTP bridge identifier 509 of "PTP B" forwards configuration commands that specify a bus identifier encompassed by the range of the secondary bus identifier 511 of "Bus I" and the subordinate bus identifier 512 of "Bus I" to the buses, virtual PTP bridges 149, and devices 160 that are downstream from the virtual PTP bridge "PTP B." The virtual PTP bridge 149-2 identified by the virtual PTP bridge identifier 509 of "PTP B" forwards MMIO commands that specify an MMIO address encompassed by the MMIO bus address range 514 of 0x3000-0x3FFF to the buses, virtual PTP bridges 149, and devices 160 that are downstream from the virtual PTP bridge "PTP B."

Thus, in response to the CPU 101-8 (in the same compute element 100-2 that comprises the north chip 137-2 that comprises the routing table 147-2) issuing a read/write command from/to a MMIO address within or encompassed by the range of 0x3000 through 0x3FFF, the north chip 137-2 finds the MMIO bus address range 514 in the row 501 that encompasses the MMIO address specified by the read/write command and sends the read/write command to the device 160-1 that is connected via the Bus I to the virtual PTP bridge PTP B 149-2 in the south chip C 143-1.

The example row 502 in the routing table 147-2 comprises data that indicates that the south chip 143-2 identified by the value "Chip D" in the south chip identifier field 510 comprises a virtual PTP bridge 149-4 identified by the value "PTP D" in the virtual PTP bridge identifier field 509 that is assigned a secondary bus identifier 511 of "Bus K," a subordinate bus identifier 512 of "Bus K," and an MMIO bus address range 514 of 0x6000-0x6FFF.

A device 160-2 is connected to the virtual PTP bridge 149-4 identified by the virtual PTP bridge identifier 509 of "PTP D" via a bus whose bus identifier is encompassed by or falls within the range of bus identifiers specified by the secondary bus identifier 511 of "Bus K" and the subordinate bus identifier 512 of "Bus K." The virtual PTP bridge 149 identified by the virtual PTP bridge identifier 509 of "PTP D" forwards configuration commands that specify a bus identifier encompassed by the range of the secondary bus identifier 511 of "Bus K" and the subordinate bus identifier 512 of "Bus K" to the buses, virtual PTP bridges 149, and devices 160 that are downstream from the virtual PTP bridge "PTP D." The virtual PTP bridge 149 identified by the virtual PTP bridge identifier 509 of "PTP D" forwards MMIO commands that specify an MMIO address encompassed by the MMIO bus address range 514 of 0X6000-0x6FFF to the buses, virtual PTP bridges 149, and devices 160 that are downstream from the virtual PTP bridge "PTP D."

Thus, in response to the CPU 101-8 (in the same compute element 100-2 that comprises the north chip 137-2 that comprises the routing table 147-2) issuing a read/write command from/to a MMIO address within or encompassed by the range of 0X6000 through 0x6FFF, the north chip 137-2 finds the MMIO bus address range 514 in the row 502 that encompasses the MMIO address specified by the read/write command and sends the read/write command to the device 160-2 that is connected via the Bus K and the egress port 305-4 to the virtual PTP bridge PTP D 149-4 in the south chip D 143-2.

As illustrated by FIG. 4 versus FIG. 5 (row 401 versus row 501 and row 402 versus 502), in an embodiment, different compute elements 100 may send commands to different virtual PTP bridges 149, these commands may specify different identifiers that name the same bus that connects to the same device 160 via the same shared port, and these commands may specify different ranges of MMIO addresses that address or specify the same locations in the same memory of the same device 160.

Figure 6:
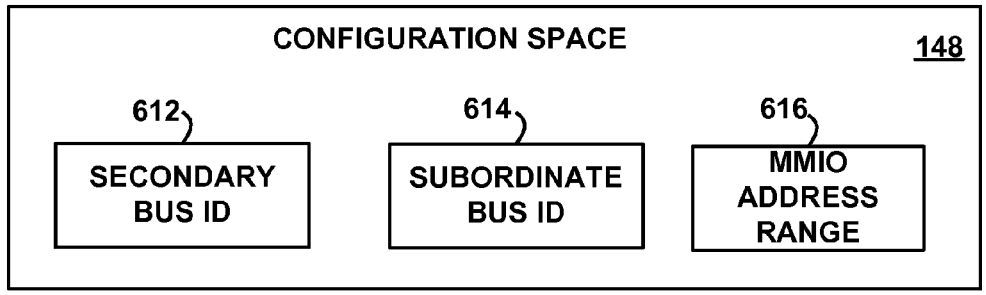
FIG. 6 depicts a block diagram of an example data structure for a configuration space, according to an embodiment of the invention.

FIG. 6 depicts a block diagram of an example data structure for a configuration space 148 within the memory of a virtual PTP bridge, according to an embodiment of the invention. The configuration space comprises a secondary bus identifier 612, a subordinate bus identifier 614, and an MMIO address range 616.

The secondary bus identifier 612 identifies the first bus that is immediately downstream from the virtual PTP bridge 149 (FIG. 1) and that connects directly to the virtual PTP bridge 149. The subordinate bus identifier 614 specifies the highest (largest) bus identifier of all of the buses that can be reached downstream (directly or indirectly) of the virtual PTP bridge 409. In various embodiments, buses that can be reached (are reachable) downstream from the virtual PTP bridge 149 are connected directly to the virtual PTP bridge 409 or indirectly through other virtual PTP bridges 149. The MMIO address range 616 specifies a range or extent of MMIO addresses that address the memory of a device or devices 160 that are downstream from the virtual PTP bridge 149 and connected directly to the virtual PTP bridge 149 via a bus or connected indirectly to the virtual PTP bridge 149 via another virtual PTP bridge or bridges and buses.

Figure 7:
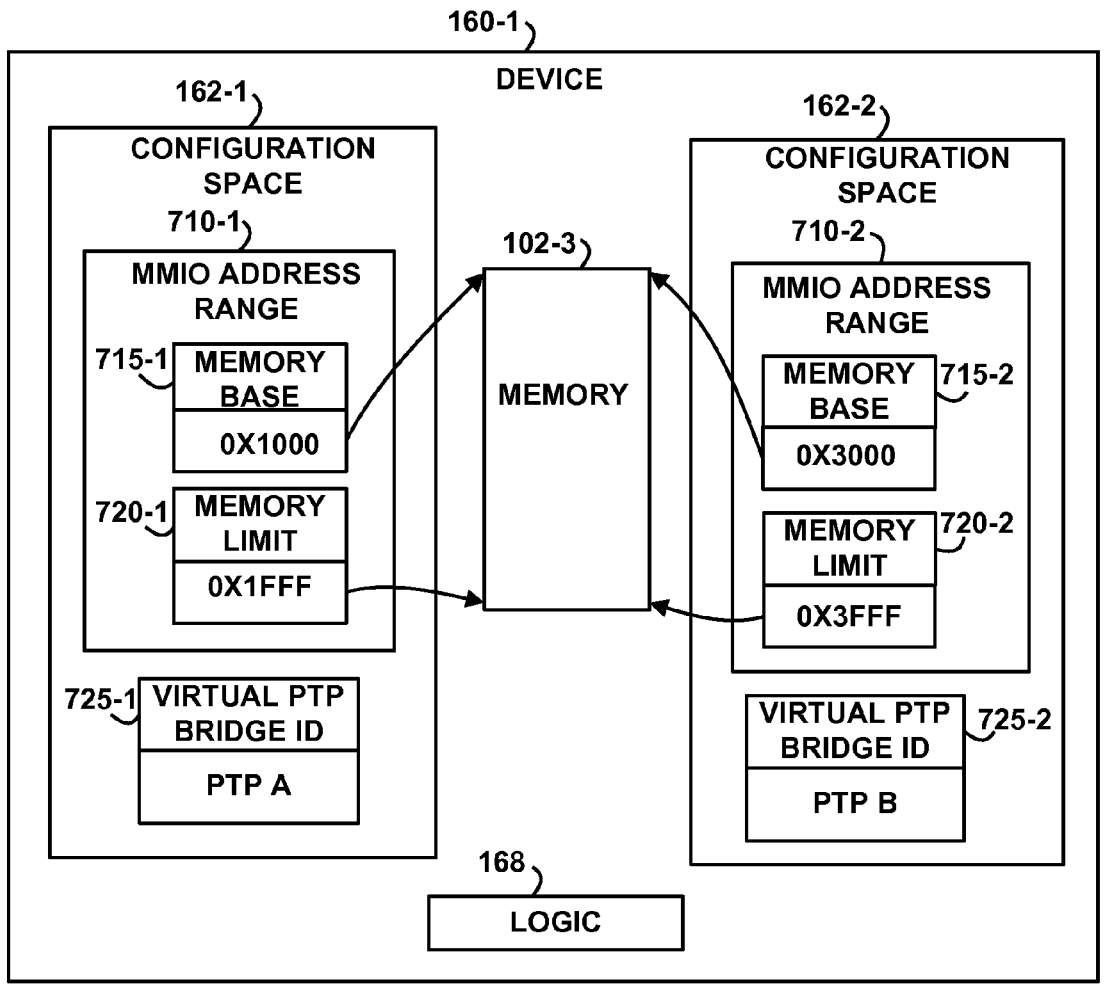
FIG. 7 depicts a block diagram of an example device, according to an embodiment of the invention.

FIG. 7 depicts a block diagram of an example device 160-1, according to an embodiment of the invention. The example device 160-1 comprises configuration spaces 162-1 and 162-2, memory 102-3, and logic 168. The configuration spaces 162-1 and 162-2 are examples of, and are generically referred to by, the configuration space 162 (FIG. 1).

The configuration space 162-1 comprises an MMIO address range 710-1 and a virtual PTP bridge identifier 725-1. The MMIO address range 710-1 specifies the address range for accessing or addressing the memory 102-3, and the device 160-1 uses that MMIO address range 710-1 to find locations in the memory 102-3 specified by addresses in commands that the device 160-1 receives from the virtual PTP bridge 149-1 identified by the virtual PTP bridge identifier 725-1. The MMIO address range 710-1 comprises a memory base address 715-1 and a memory limit address 720-1. The memory base address 715-1 specifies the address of the initial or first memory location in the memory 102-3 and the memory limit address 720-1 specifies the address of the final or last memory location in the memory 102-3 when addressed by commands from the virtual PTP bridge 149-1 identified by the virtual PTP bridge identifier 725-1. All other memory addresses (specified in commands received by the device 160-1 from the virtual PTP bridge identified by the virtual PTP bridge identifier 725-1) of the memory 102-3 are between or encompassed by the memory base address 715-1 and the memory limit address 720-1 (greater than or equal to the memory base address 715-1 and less than or equal to the memory limit address 720-1).

The configuration space 162-2 comprises an MMIO address range 710-2 and a virtual PTP bridge identifier 725-2. The MMIO address range 710-2 specifies the address range for accessing or addressing the memory 102-3, and the device 160-1 uses that MMIO address range 710-2 to find locations in the memory 102-3 specified by addresses in commands that the device 160-1 receives from the virtual PTP bridge 149-2 identified by the virtual PTP bridge identifier 725-2. The MMIO address range 710-2 comprises a memory base address 715-2 and a memory limit address 720-2. The memory base address 715-2 specifies the address of the initial or first memory location in the memory 102-3 and the memory limit address 720-2 specifies the address of the final or last memory location in the memory 102-2 when addressed by commands from the virtual PTP bridge identified by the virtual PTP bridge identifier 725-2. All other memory addresses (specified in commands received by the device 160-1 from the virtual PTP bridge identifier 725-2) of the memory 102-3 are between or encompassed by the memory base address 715-2 and the memory limit address 720-2. Thus, the device 160-1 stores different MMIO address ranges 710-1 and 710-2 for commands received from different virtual PTP bridges 149-1 and 149-2 identified by different virtual PTP bridge identifiers 725-1 and 725-2.

In another embodiment, the memory base address 715-1 and 715-2 and the memory limit address 720-1 and 720-2 represent addressable memory locations of memory that is connected to the device 160 via a network. In such an embodiment, the device 160 is implemented as a network device, network interface card, I/O processor, or I/O adapter.

Figure 8:
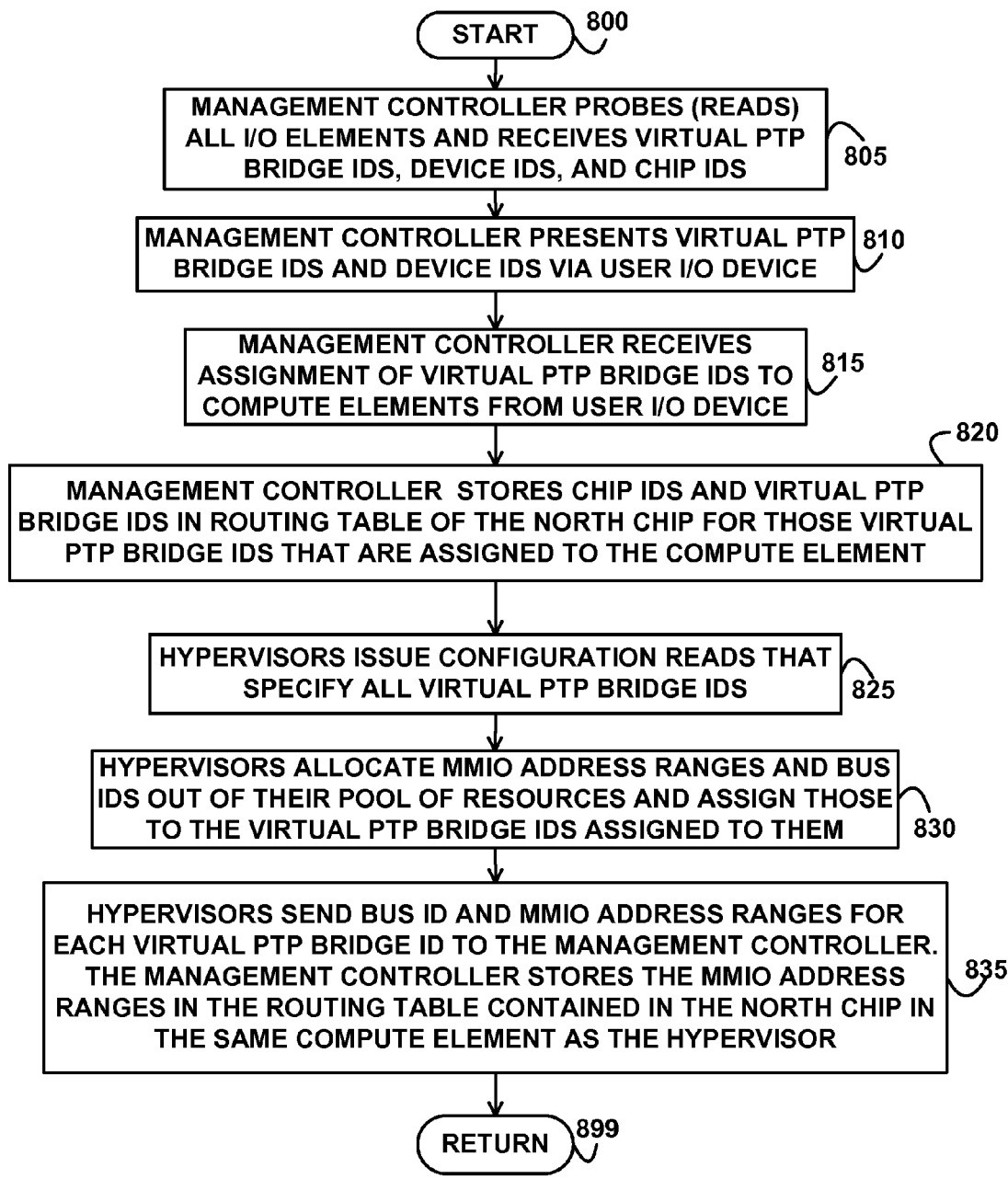
FIG. 8 depicts a flowchart of example processing for creating a routing table, according to an embodiment of the invention.

FIG. 8 depicts a flowchart of example processing for creating a routing table, according to an embodiment of the invention. Control begins at block 800.

Control then continues to block 805 where the management controller 141 probes (reads) the south chips 143 in all I/O elements 132. The management controller 141 sends a request or command to all connected I/O elements 132 that requests data that describes the south chips 143, the virtual PTP bridges 149 contained in the south chips 143, and the devices 160 connected to the virtual PTP bridges 149. In response, the south chips 143 sends to the management controller 141 identifiers of the south chips 143, virtual PTP bridge identifiers of the virtual PTP bridges 149 in the south chips 143, and device identifiers of the devices 160 that are connected to the virtual PTP bridges 149.

Control then continues to block 810 where the management controller 141 presents the received virtual PTP bridge identifiers and device identifiers via the user I/O device 190.

Control then continues to block 815 where the user enters an assignment of virtual PTP bridge identifiers to compute elements 100 via the user I/O device 190. The management controller 141 receives the assignment of virtual PTP bridge identifiers to compute elements 100 from the user I/O device 190.

Control then continues to block 820 where the management controller 141 writes the virtual PTP bridge identifiers and south chip identifiers into the routing tables 147 (e.g., into the fields 409 and 410 or 509 and 510) in the north chips 137 for those PTP virtual PTP bridges identifiers that are assigned to the compute elements 100 that comprise the north chips 137.

Control then continues to block 825 where the hypervisors in each compute element create configuration read commands that specify all possible virtual PTP bridge identifiers. The hypervisors send the configuration read commands to their respective north chips 137. The north chips 137 read their respective routing tables 147 and compare the virtual PTP bridge identifiers in the configuration read commands to the virtual PTP bridge identifiers 409 in their routing tables. For those virtual PTP bridge identifiers that match, the north chips 137 report to their respective hypervisor that the virtual PTP bridge identifier is assigned to the respective hypervisor, meaning that the hypervisor is allowed to send commands to the virtual PTP bridge 149 identified by that virtual PTP bridge identifier. For those virtual PTP bridge identifiers specified in the configuration read that do not match the virtual PTP bridge identifier 409 in the routing table of the north chip 137, the north chip 137 reports to the hypervisor that the virtual PTP bridge identifier is not assigned to the hypervisor, meaning that the hypervisor does not send commands to the virtual PTP bridges 149 identified by those non-matching virtual PTP bridge identifiers.

Control then continues to block 830 where the hypervisors in each compute element receive the virtual PTP bridge identifiers that are assigned to the hypervisors from the north chip 137 and allocate MMIO address ranges and bus identifiers (secondary bus identifiers and subordinate bus identifiers) to the virtual PTP bridge identifiers. The hypervisors allocate the MMIO address ranges and bus identifiers from a pool of resources that are allocated to the hypervisors. In an embodiment, the hypervisors divide their bus identifiers and MMIO address space resources among the virtual PTP bridges 149 assigned to their compute elements 100, assigning bus identifier ranges and MMIO address ranges to the assigned virtual PTP bridges 149. In an embodiment, the hypervisors divide their bus identifiers by assigning bus identifiers to buses downstream from the virtual PTP bridges 149 in the order in which the buses exist downstream from the virtual PTP bridges 149. In an embodiment, the hypervisors assign MMIO address ranges to the assigned virtual PTP bridges 149 in proportion to the amount of memory in the devices 160 that are connected to the virtual PTP bridges 149 via the buses downstream from the virtual PTP bridges 149.

Control then continues to block 835 where the hypervisors send the secondary and subordinate bus identifiers and MMIO address ranges for each virtual PTP bridge identifier to the management controller 141. The management controller 141 finds the routing table 147 that is contained in the north chip 137 that is in the same compute element 100 as the hypervisor. The management controller 141 then finds the virtual PTP bridge identifier in that routing table 147 that matches the virtual PTP bridge identifier received from the hypervisors and stores the bus identifiers in the same row into the secondary bus identifier field 411 or 511 and the subordinate bus identifier field 412 or 512. The management controller 141 further stores, in the same row, the received MMIO address range into the MMIO address range field 414 or 514.

Control then continues to block 899 where the logic of FIG. 8 returns.

Figure 9A:
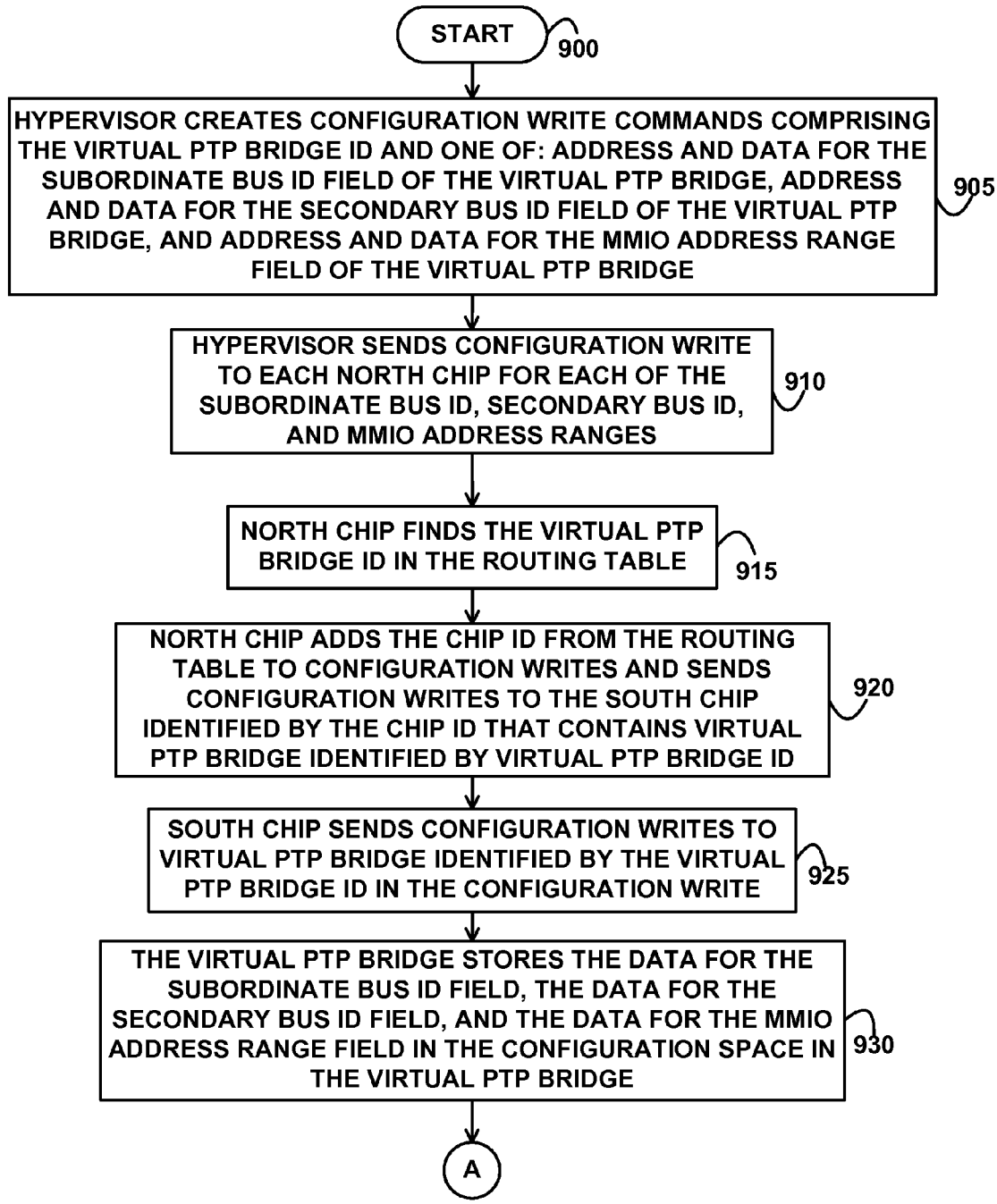
FIG. 9A depicts a flowchart of example processing for configuration write commands to virtual bridges, according to an embodiment of the invention.
Figure 9B:
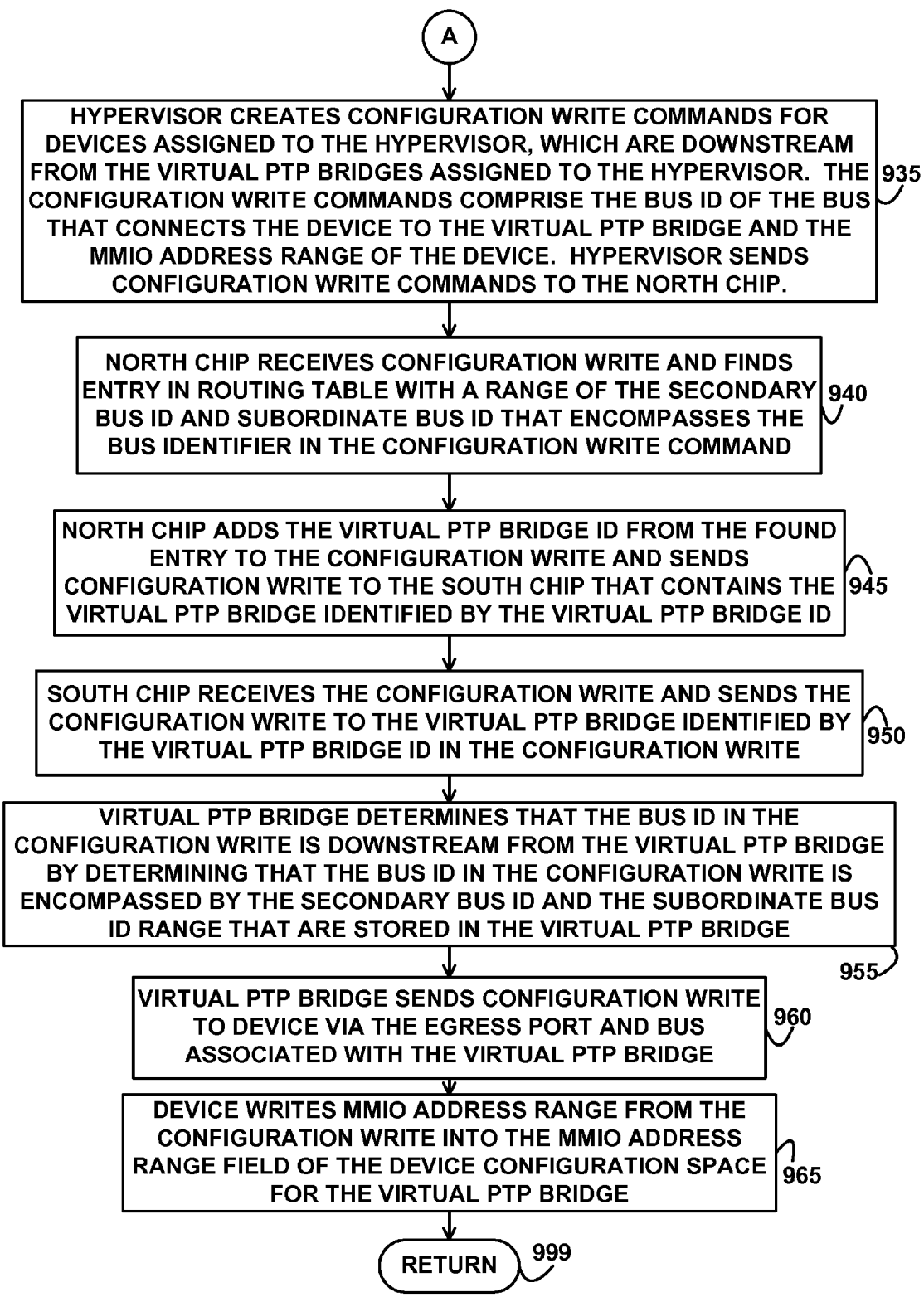
FIG. 9B depicts a flowchart of example processing for configuration write commands to devices, according to an embodiment of the invention.

FIGS. 9A and 9B depict flowcharts of example processing for configuration write commands to virtual PTP bridges 149 and devices, according to an embodiment of the invention. The logic of FIGS. 9A and 9B is executed for each compute element 100 and for each hypervisor in each compute element, and each hypervisor sends commands to its own virtual PTP bridge 149 and specifies its own subordinate bus identifiers, secondary bus identifiers, and MMIO address ranges, which may be different than the subordinate and secondary bus identifiers and MMIO address ranges used by other hypervisors to access the same memory in the same device 160 via a shared port. Control begins at block 900 of FIG. 9A.

Control then continues to block 905 where the hypervisors create configuration write commands for each of their assigned virtual PTP bridges 149. Each configuration write command comprises a virtual PTP bridge identifier that identifies the virtual PTP bridge 149 and one of an address and data for the subordinate bus identifier field of the virtual PTP bridge, an address and data for the secondary bus identifier field of the virtual PTP bridge, and an address and data for the MMIO address range fields (the memory base address and the memory limit address) of the virtual PTP bridge identified by the virtual PTP bridge identifier. Thus, in an embodiment, the hypervisors create a separate configuration write for each of the subordinate bus identifier, the secondary bus identifier, the memory base address, and the memory limit address. In another embodiment, one configuration write command includes all of the subordinate bus identifier, the secondary bus identifier, the memory base address, and the memory limit address.

Control then continues to block 910 where the hypervisors send each configuration write command to their north chips 137 for each of the subordinate bus identifier, the secondary bus identifier, and the MMIO address ranges.

Control then continues to block 915 where the north chips 137 receive each configuration write command and find the row or entry in the routing table 147 with a value in its virtual PTP bridge identifier field 409 or 509 that matches the virtual PTP bridge identifier in the configuration write command.

Control then continues to block 920 where the north chips 137 add the found chip identifier (from the routing table in the same entry as the virtual PTP bridge identifier in the command) to the configuration write commands and send the configuration write commands to the south chips 143 that are identified by the found chip identifier and that contain the virtual PTP bridge 149 identified by the virtual PTP bridge identifier. The north chips 137 further send each configuration write command to the south chips 143 via the connection mesh fabric 155.

Control then continues to block 925 where the south chips 143 receive the configuration write commands and send the configuration write commands to the virtual PTP bridge 149 identified by the virtual PTP bridge identifier in the configuration write commands.

Control then continues to block 930 where the virtual PTP bridge 149 identified by the virtual PTP bridge identifier in the configuration write command receives the configuration write command and stores the received data of the secondary bus identifier, the subordinate bus identifier, and the MMIO bus address range into the configuration space 162 of the virtual PTP bridge 149.

Control then continues to block 935 of FIG. 9B where the hypervisors create configuration write commands for devices 160 assigned to the hypervisors that are downstream from the virtual PTP bridges 149 assigned to the hypervisors. The configuration read/write commands comprise the bus identifier of the bus that connects the device 160 to the virtual PTP bridge 149 and the MMIO address range of the device 160. The hypervisors send the configuration write commands to their respective north chips 137.

Control then continues to block 940 where the north chip 137 receives the configuration write command and finds the row or entry in the routing table that comprises a range of a secondary bus identifier 411 or 511 and a subordinate bus identifier 412 or 512 that encompasses the bus identifier in the configuration read/write command. The bus identifier in the configuration write command is encompassed by the range of the secondary bus identifier 411 or 511 and the subordinate bus identifier 412 or 512 if the command bus identifier is greater than or equal to the secondary bus identifier 411 or 511 and less than or equal to the subordinate bus identifier 412 or 512. The bus identifier in the configuration write command is not encompassed by the secondary bus identifier 411 or 511 and subordinate bus identifier 412 or 512 if the command bus identifier is less than the secondary bus identifier 411 or 511 or greater than the subordinate bus identifier 412 or 512.

Control then continues to block 945 where the north chip 137 finds the virtual PTP bridge identifier 409 or 509 and the south chip identifier 410 or 510 in the same entry as the bus range that was found to encompass the bus identifier of the configuration write command and adds the found virtual PTP bridge identifier and the found chip identifier to the configuration write command. The north chip 137 further sends the configuration write command to the south chip 143 (identified by the found south chip identifier) that contains the virtual PTP bridge 149 (identified by the virtual PTP bridge identifier).

Control then continues to block 950 where the south chip 143 identified by the chip identifier in the configuration write command receives the configuration write command and sends the configuration write command to the virtual PTP bridge identified by the virtual PTP bridge identifier in the configuration write command.

Control then continues to block 955 where the virtual PTP bridge 149 receives a configuration write command and determines that the bus identifier in the configuration write command is downstream from the virtual PTP bridge 149 by determining that the bus identifier in the configuration write is encompassed by the secondary bus identifier and the subordinate bus identifier range that is stored in the virtual PTP bridge 149.

Virtual PTP bridges 149 that detect the configuration write command on their ingress ports compare the bus identifier in the configuration write command to the secondary bus identifier 612 and the subordinate bus identifier 614 that are stored in their configuration space 148 in the virtual PTP bridge 149. If the range specified by the secondary bus identifier 612 and the subordinate bus identifier 614 that are stored in the virtual PTP bridge 149 encompasses the bus identifier in the configuration write command, then the virtual PTP bridge 149 forwards or sends the configuration write command downstream to the bus connected to the egress port of the virtual PTP bridge 149. If the range specified by the secondary bus identifier 612 and the subordinate bus identifier 614 that are stored in the virtual PTP bridge 149 does not encompass the bus identifier in the configuration write command, then the virtual PTP bridge 149 does not forward or send the configuration write command downstream to the bus connected to the egress port of the virtual PTP bridge 149.

Control then continues to block 960 where the virtual PTP bridge 149 that has determined that the bus identifier in the configuration write command is encompassed by the range specified in the virtual PTP bridge 149 sends the configuration write command to the device 160 that is connected to the virtual PTP bridge 149 via the egress port and the bus that connects the egress port to the device 160.

Control then continues to block 965 where the device 160 receives the configuration write command and writes the MMIO address range from the configuration write command into the MMIO address range field 710-1 or 710-2 in the device configuration space 162-1 or 162-2 that is assigned to the virtual PTP bridge 149 specified in the configuration write command, via a match of the virtual PTP bridge identifier 725-1 or 725-2 to the virtual PTP bridge identifier in the configuration write command. The MMIO address range field specifies the lower and upper bound of addresses that identify locations within the memory of the device 160.

Control then continues to block 999 where the logic of FIGS. 9A and 9B return.

Figure 10:
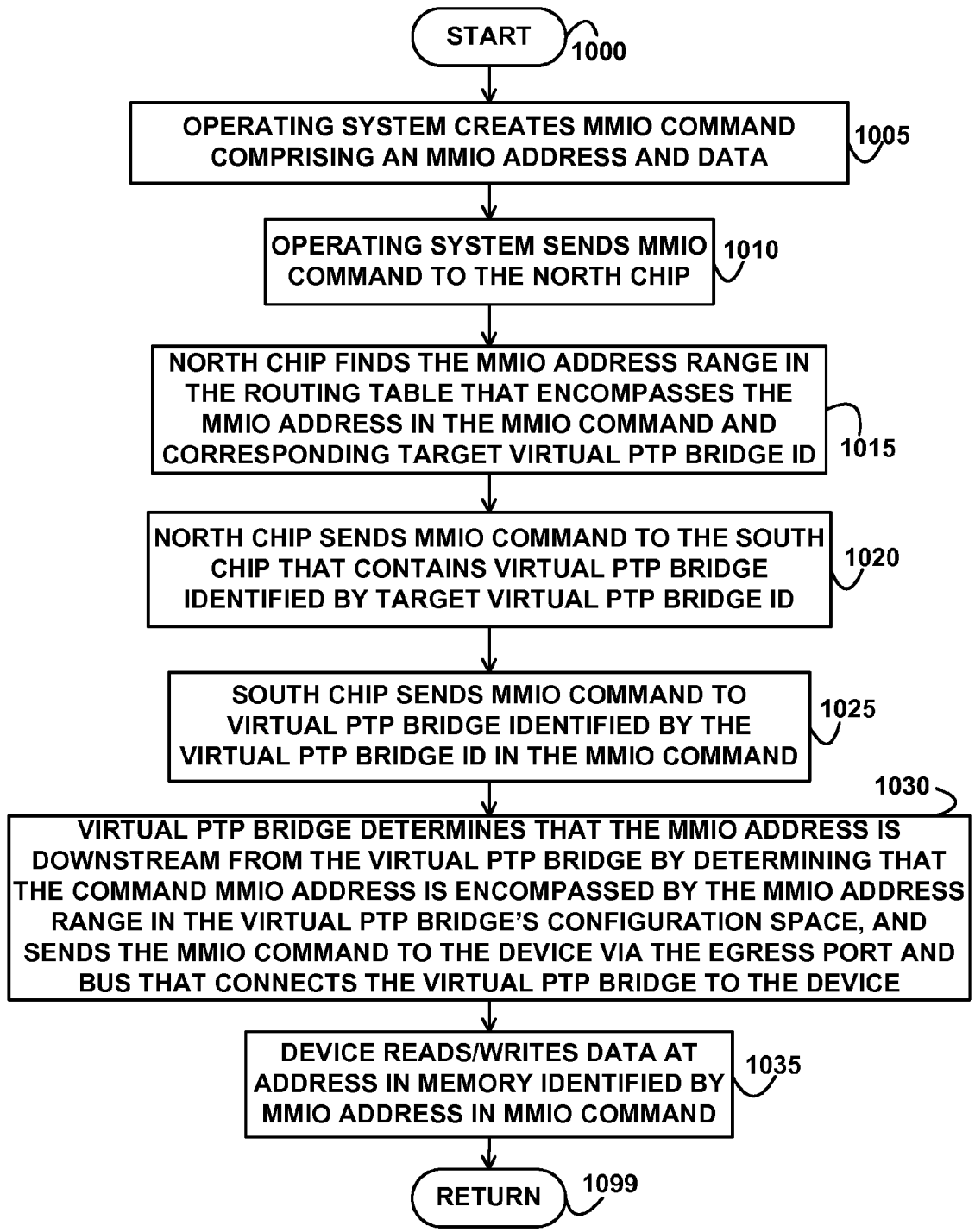
FIG. 10 depicts a flowchart of example processing for an MMIO command, according to an embodiment of the invention.

FIG. 10 depicts a flowchart of example processing for an MMIO command, according to an embodiment of the invention. The processing of FIG. 10 is executed for each compute element and for each operating system. Control begins at block 1000.

Control then continues to block 1005 where the operating system 105-1 or 105-2 creates an MMIO read or write command that comprises an MMIO address. If the MMIO command is a write command, the MMIO command also comprises data to be written to a device 160 that is assigned a range of MMIO addresses that encompasses the MMIO address specified by the write command. If the MMIO command is a read command, the MMIO read command requests that data be read from the MMIO address at a device 160 that is assigned a range of MMIO addresses that encompasses the MMIO address specified by the read command.

Control then continues to block 1010 where the operating system 105-1 or 105-2 sends the MMIO command to the north chip 137. Control then continues to block 1015 where the north chip 137 receives the MMIO command and, in response, finds a MMIO bus address range 414 or 514 in the routing table 147-1 or 147-2 that contains or encompasses the MMIO address of the MMIO command. The MMIO bus address range 414 or 514 in a row of the routing table 147-1 or 147-2 contains or encompasses the MMIO address if the MMIO address in the MMIO command is greater than or equal to the lower bound of the MMIO bus address range 414 or 514 and less than or equal to the upper bound of the MMIO bus address range 414 or 514, i.e., if the MMIO address is within the MMIO bus address range 414 or 514. If the MMIO address in the MMIO command is less than the lower bound of the MMIO bus address range 414 or 514 or greater than the upper bound of the MMIO bus address range 414 or 514, then the MMIO address in the MMIO command is not encompassed by and is not within the MMIO bus address range 414 or 514 of that row in the routing table 147-1 or 147-2. The north chip 137 further finds the target virtual PTP bridge identifier 409 or 509 and the south chip identifier 410 or 510 that are assigned the found MMIO bus address range 414 or 514 in the same row of the routing table 147-1 or 147-2. The north chip 137 adds the found target virtual PTP bridge identifier 409 or 509 and the found south chip identifier 410 or 510 to the MMIO command.

Control then continues to block 1020 where the north chip 137 sends the MMIO command that comprises the found target virtual PTP bridge identifier and the found south chip identifier to the south chip 143 that is identified by the found target south chip identifier and that contains the virtual PTP bridge 149 identified by the found target virtual PTP bridge identifier.

Control then continues to block 1025 where the south chip 143 identified by the south chip identifier in the MMIO command receives the MMIO command and sends the MMIO command to the virtual PTP bridge 149 identified by the virtual PTP bridge identifier in the MMIO command.

Control then continues to block 1030 where the virtual PTP bridge 149 receives the MMIO command and sends it to the device 160 that is connected to the virtual PTP bridge 149 via the egress port of the virtual PTP bridge 149 and bus that connects the device 160 to the egress port. Virtual PTP bridges that detect the MMIO command on their ingress ports compare the MMIO address in the MMIO command to the MMIO bus address range 616 that is stored in the configuration space 148 of the virtual PTP bridge 149.

If the MMIO bus address range 616 that is stored in the virtual PTP bridge 149 encompasses the MMIO address in the MMIO command, then the virtual PTP bridge 149 forwards or sends the MMIO command downstream to the bus connected to the egress port of the virtual PTP bridge 149. If the MMIO bus address range 616 that is stored in the virtual PTP bridge 149 does not encompasses the MMIO address in the MMIO command, then the virtual PTP bridge 149 does not forward or send the MMIO command downstream to the bus connected to the egress port of the virtual PTP bridge 149.

Control then continues to block 1035 where the device 160 receives the MMIO command and, in response, reads/writes data from/to the MMIO address location specified by the MMIO command in the memory 102-3 in the device 160. The device 160 finds the virtual PTP bridge identifier 725-1 or 725-2 in the configuration space 162-1 or 162-2 of the device 160 that matches the PTP bridge identifier in the MMIO command and uses the MMIO address range 710-1 or 710-2 to find the location in the memory 102-3 of the device that is specified by the MMIO address in the MMIO command.

For example, if the virtual PTP bridge identifier in the MMIO command matches the virtual PTP bridge identifier 725-1, then the device 160 subtracts the memory base address 715-1 from the MMIO address in the command and adds the difference to the address of the location of the start of the memory 102-3 to yield the memory location addressed by the MMIO command. But, if the virtual PTP bridge identifier in the MMIO command matches the virtual PTP bridge identifier 725-2, then the device 160 subtracts the memory base address 715-2 from the MMIO address in the command and adds the difference to the address of the location of the start of the memory 102-3 to yield the memory location addressed by the MMIO command.

Thus, the device 160 uses the MMIO address range 710-1 to access the memory 102-3 for MMIO commands received from the virtual bridge identified by the virtual PTP bridge identifier 725-1 and uses the MMIO address range 710-2 to access the memory 102-3 for MMIO commands received from the virtual bridge identified by the virtual PTP bridge identifier 725-2.

Control then continues to block 1099 where the logic of FIG. 10 returns.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of the stated features, integers, steps, operations, elements, and/or components, but do not preclude the presence or addition of one or more other features, integers, steps, operations, elements, components, and/or groups thereof.

In the previous detailed description of exemplary embodiments of the invention, reference was made to the accompanying drawings (where like numbers represent like elements), which form a part hereof, and in which is shown by way of illustration specific exemplary embodiments in which the invention may be practiced. These embodiments were described in sufficient detail to enable those skilled in the art to practice the invention, but other embodiments may be utilized and logical, mechanical, electrical, and other changes may be made without departing from the scope of the present invention. In the previous description, numerous specific details were set forth to provide a thorough understanding of embodiments of the invention. But, embodiments of the invention may be practiced without these specific details. In other instances, well-known circuits, structures, and techniques have not been shown in detail in order not to obscure embodiments of the invention.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure is not necessary. The previous detailed description is, therefore, not to be taken in a limiting sense, and the scope of the present invention is defined only by the appended claims.

What is claimed is:

1. A method comprising:

receiving, at a first virtual bridge in a south chip, a first secondary bus identifier that identifies a bus that is immediately downstream from the first virtual bridge, a first subordinate bus identifier that identifies a highest bus identifier of all of buses reachable downstream from the first virtual bridge, and a first MMIO bus address range from a first north chip, wherein the first north chip is connected to the south chip via a first point-to-point connection;

storing, at the first virtual bridge, the first secondary bus identifier, the first subordinate bus identifier, and the first MMIO bus address range;

receiving, at a second virtual bridge in the south chip, a second secondary bus identifier that identifies a bus that is immediately downstream from the second virtual bridge, a second subordinate bus identifier that identifies a highest bus identifier of all of the buses reachable downstream from the second virtual bridge, and a second MMIO bus address range from a second north chip, wherein the second north chip is connected to the south chip via a second point-to-point connection;

storing, at the second virtual bridge, the second secondary bus identifier, the second subordinate bus identifier, and the second MMIO bus address range, wherein the first virtual bridge and the second virtual bridge are connected to a shared egress port;

receiving, at the first virtual bridge via a shared ingress port, a first configuration write command that comprises a first command bus identifier, a first virtual bridge identifier that identifies the first virtual bridge, and a first device MMIO address range;

comparing, at the first virtual bridge, the first command bus identifier to the first secondary bus identifier and the first subordinate bus identifier; and if the first secondary bus identifier and the first subordinate bus identifier encompass the first command bus identifier, sending the first configuration write command from the first virtual bridge to a device connected to the shared egress port.

2. The method of claim 1, further comprising:

if the first secondary bus identifier and the first subordinate bus identifier do not encompass the first command bus identifier, refraining from sending the first configuration write command from the first virtual bridge to the device connected to the shared egress port.

3. The method of claim 2, further comprising:

receiving, at the second virtual bridge via a shared ingress port, a second configuration write command that comprises a second command bus identifier, a second virtual bridge identifier that identifies the second virtual bridge, and a second device MMIO address range;

comparing, at the second virtual bridge, the second command bus identifier to the second secondary bus identifier and the second subordinate bus identifier;

if the second secondary bus identifier and the second subordinate bus identifier encompass the second command bus identifier, sending the second configuration write command from the second virtual bridge to the device connected to the shared egress port; and if the second secondary bus identifier and the second subordinate bus identifier do not encompass the second command bus identifier, refraining from sending the second configuration write command from the second virtual bridge to the device connected to the shared egress port.

4. The method of claim 3, wherein the device stores the first device MMIO address range, the first virtual bridge identifier, the second MMIO device address range, and the second virtual bridge identifier.

5. The method of claim 4, further comprising:

receiving, at the first virtual bridge via the shared ingress port, a first MMIO command comprising a first command MMIO address;

comparing, at the first virtual bridge, the first command MMIO address to the first MMIO bus address range;

if the first MMIO bus address range encompasses the first command MMIO address, sending the first MMIO command from the first virtual bridge to the device connected to the shared egress port; and if the first MMIO bus address range does not encompass the first command MMIO address, refraining from sending the first MMIO command from the first virtual bridge to the device connected to the shared egress port.

6. The method of claim 5, further comprising:

receiving, at the second virtual bridge via the shared ingress port, a second MMIO command comprising a second command MMIO address;

comparing, at the second virtual bridge, the second command MMIO address to the second MMIO bus address range;

if the second MMIO bus address range encompasses the second command MMIO address, sending the second MMIO command from the second virtual bridge to the device connected to the shared egress port; and if the second MMIO bus address range does not encompass the second command MMIO address, refraining from sending the second MMIO command from the second virtual bridge to the device connected to the shared egress port.

7. The method of claim 6, wherein the device accesses memory in the device with the first MMIO bus address range for the first MMIO command received from the first virtual bridge and accesses the memory with the second MMIO bus address range for the second MMIO command received from the second virtual bridge.

8. A non-transitory computer-readable storage medium having instructions stored therein, that when executed by a processor, cause the processor to perform:

receiving, at a first virtual bridge in a south chip, a first secondary bus identifier that identifies a bus that is immediately downstream from the first virtual bridge, a first subordinate bus identifier that identifies a highest bus identifier of all of buses reachable downstream from the first virtual bridge, and a first MMIO bus address range from a first north chip, wherein the first north chip is connected to the south chip via a first point-to-point connection;

storing, at the first virtual bridge, the first secondary bus identifier, the first subordinate bus identifier, and the first MMIO bus address range;

receiving, at a second virtual bridge in the south chip, a second secondary bus identifier that identifies a bus that is immediately downstream from the second virtual bridge, a second subordinate bus identifier that identifies a highest bus identifier of all of the buses reachable downstream from the second virtual bridge, and a second MMIO bus address range from a second north chip, wherein the second north chip is connected to the south chip via a second point-to-point connection;

storing, at the second virtual bridge, the second secondary bus identifier, the second subordinate bus identifier, and the second MMIO bus address range, wherein the first virtual bridge and the second virtual bridge are connected to a shared egress port, and wherein the first MMIO bus address range and the second MMIO bus address range are different;

receiving, at the first virtual bridge via a shared ingress port, a first configuration write command that comprises a first command bus identifier, a first virtual bridge identifier that identifies the first virtual bridge, and a first device MMIO address range;

comparing, at the first virtual bridge, the first command bus identifier to the first secondary bus identifier and the first subordinate bus identifier;

if the first secondary bus identifier and the first subordinate bus identifier encompass the first command bus identifier, sending the first configuration write command from the first virtual bridge to a device connected to the shared egress port; and if the first secondary bus identifier and the first subordinate bus identifier do not encompass the first command bus identifier, refraining from sending the first configuration write command from the first virtual bridge to the device connected to the shared egress port.

9. The non-transitory computer-readable storage medium of claim 8, further comprising:

receiving, at the second virtual bridge via a shared ingress port, a second configuration write command that comprises a second command bus identifier, a second virtual bridge identifier that identifies the second virtual bridge, and a second device MMIO address range;

comparing, at the second virtual bridge, the second command bus identifier to the second secondary bus identifier and the second subordinate bus identifier;

if the second secondary bus identifier and the second subordinate bus identifier encompass the second command bus identifier, sending the second configuration write command from the second virtual bridge to the device connected to the shared egress port; and if the second secondary bus identifier and the second subordinate bus identifier do not encompass the second command bus identifier, refraining from sending the second configuration write command from the second virtual bridge to the device connected to the shared egress port.

10. The non-transitory computer-readable storage medium of claim 9, wherein the device stores the first device MMIO address range, the first virtual bridge identifier, the second MMIO device address range, and the second virtual bridge identifier.

11. The non-transitory computer-readable storage medium of claim 10, further comprising:

receiving, at the first virtual bridge via the shared ingress port, a first MMIO command comprising a first command MMIO address;

comparing, at the first virtual bridge, the first command MMIO address to the first MMIO bus address range;

if the first MMIO bus address range encompasses the first command MMIO address, sending the first MMIO command from the first virtual bridge to the device connected to the shared egress port; and if the first MMIO bus address range does not encompass the first command MMIO address, refraining from sending the first MMIO command from the first virtual bridge to the device connected to the shared egress port.

12. The non-transitory computer-readable storage medium of claim 11, further comprising:

receiving, at the second virtual bridge via the shared ingress port, a second MMIO command comprising a second command MMIO address;

comparing, at the second virtual bridge, the second command MMIO address to the second MMIO bus address range;

if the second MMIO bus address range encompasses the second command MMIO address, sending the second MMIO command from the second virtual bridge to the device connected to the shared egress port; and if the second MMIO bus address range does not encompass the second command MMIO address, refraining from sending the second MMIO command from the second virtual bridge to the device connected to the shared egress port.

13. The non-transitory computer-readable storage medium of claim 12, wherein the device accesses memory in the device with the first MMIO bus address range for the first MMIO command received from the first virtual bridge and accesses the memory with the second MMIO bus address range for the second MMIO command received from the second virtual bridge.

14. A computer system comprising:
a first north chip;
a second north chip;
a device connected to a shared egress port via a bus; and
a input/output element communicatively connected to the first north chip via a first point-to-point connection and communicatively connected to the second north chip via a second point-to-point connection, wherein the input/output element comprises a south chip, wherein the south chip comprises a first virtual bridge connected to the shared egress port and a second virtual bridge connected to the shared egress port, wherein the first virtual bridge receives a first secondary bus identifier, a first subordinate bus identifier, and a first MMIO bus address range from the first north chip, wherein the second virtual bridge receives a second secondary bus identifier, a second subordinate bus identifier, and a second MMIO bus address range from the second north chip, and wherein the first MMIO bus address range and the second MMIO bus address range are different, wherein the first virtual bridge stores the first virtual bridge, the first secondary bus identifier that identifies a bus that is immediately downstream from the first virtual bridge, the first subordinate bus identifier that identifies a highest bus identifier of all of buses reachable downstream from the first virtual bridge, and the first MMIO bus address range, and wherein the second virtual bridge stores the second secondary bus identifier that identifies a bus that is immediately downstream from the second virtual bridge, the second subordinate bus identifier that identifies a highest bus identifier of all of the buses reachable downstream from the second virtual bridge, and the second MMIO bus address range, wherein the first virtual bridge receives, via a shared ingress port, a first configuration write command that comprises a first command bus identifier, a first virtual bridge identifier that identifies the first virtual bridge, and a first device MMIO address range, wherein the first virtual bridge compares the first command bus identifier to the first secondary bus identifier and the first subordinate bus identifier, wherein if the first secondary bus identifier and the first subordinate bus identifier encompass the first command bus identifier, the first virtual bridge sends the first configuration write command to the device, and wherein if the first secondary bus identifier and the first subordinate bus identifier do not encompass the first command bus identifier, the first virtual bridge refrains from sending the first configuration write command to the device.

15. The computer system of claim 14, wherein the second virtual bridge receives, via the shared ingress port, a second configuration write command that comprises a second command bus identifier, a second virtual bridge identifier that identifies the second virtual bridge, and a second device MMIO address range, wherein the second virtual bridge compares the second command bus identifier to the second secondary bus identifier and the second subordinate bus identifier, wherein if the second secondary bus identifier and the second subordinate bus identifier encompass the second command bus identifier, the second virtual bridge sends the second configuration write command to the device, wherein the device stores the first device MMIO address range, the first virtual bridge identifier, the second MMIO device address range, and the second virtual bridge identifier, and wherein if the second secondary bus identifier and the second subordinate bus identifier do not encompass the second command bus identifier, the second virtual bridge refrains from sending the second configuration write command to the device.

16. The computer system of claim 15, wherein the first virtual bridge receives, via the shared ingress port, a first MMIO command comprising a first command MMIO address, wherein the first virtual bridge compares the first command MMIO address to the first MMIO bus address range, wherein if the first MMIO bus address range encompasses the first command MMIO address, the first virtual bridge sends the first MMIO command to the device, wherein the device accesses memory in the device with the first MMIO bus address range for the first MMIO command received from the first virtual bridge, and wherein if the first MMIO bus address range does not encompass the first command MMIO address, the first virtual bridge refrains from sending the first MMIO command from the first virtual bridge to the device.

17. The computer system of claim 16, wherein the second virtual bridge receives, via the shared ingress port, a second MMIO command comprising a second command MMIO address, wherein the second virtual bridge compares the second command MMIO address to the second MMIO bus address range, wherein if the second MMIO bus address range encompasses the second command MMIO address, the second virtual bridge sends the second MMIO command to the device, wherein the device accesses the memory with the second MMIO bus address range for the second MMIO command received from the second virtual bridge, and wherein if the second MMIO bus address range does not encompass the second command MMIO address, the second virtual bridge refrains from sending the second MMIO command to the device.

* * * * *